US012807772B2

(12) United States Patent
Kaneko et al.

(10) Patent No.: US 12,807,772 B2
(45) Date of Patent: Nov. 24, 2026

(54) HEAT-SHRINKABLE POLYESTER FILM

(71) Applicants: C.I. TAKIRON Corporation, Osaka (JP); Bonset America Corporation, Browns Summit, NC (US); Bonset Latin America S.A., Barros Blancos Canelones (UY)

(72) Inventors: Takuma Kaneko, Osaka (JP); Yuichiro Kanzaka, Osaka (JP); Shuuta Yuge, Osaka (JP); Tatsuya Irifune, Osaka (JP); Masanao Miyoshi, Osaka (JP)

(73) Assignees: C.I. Takiron Corporation, Osaka (JP); Bonset America Corporation, Browns Summit, NC (US)

( * ) Notice: Subject to any disclaimer, the term of this patent is extended or adjusted under 35 U.S.C. 154(b) by 612 days.

(21) Appl. No.: 18/250,062

(22) PCT Filed: Nov. 30, 2020

(86) PCT No.: PCT/JP2020/044562
§ 371 (c)(1),
(2) Date: Apr. 21, 2023

(87) PCT Pub. No.: WO2022/113364
PCT Pub. Date: Jun. 2, 2022

(65) Prior Publication Data

US 2023/0391967 A1 Dec. 7, 2023

(51) Int. Cl.

| | |
|---|---|
| ***C08J 5/18*** | (2006.01) |
| ***B29C 61/02*** | (2006.01) |
| *B29K 67/00* | (2006.01) |
| *B29L 31/00* | (2006.01) |

(52) U.S. Cl.
CPC ................. *C08J 5/18* (2013.01); *B29C 61/02* (2013.01); *B29K 2067/00* (2013.01); *B29K 2995/0029* (2013.01); *B29K 2995/0037* (2013.01); *B29K 2995/0077* (2013.01); *B29L 2031/744* (2013.01); *C08J 2367/02* (2013.01)

(58) Field of Classification Search
CPC ..... C08J 5/18; C08J 2367/03; B29K 2067/00; B29K 2105/00
See application file for complete search history.

(56) References Cited

U.S. PATENT DOCUMENTS

| | | | |
|---|---|---|---|
| 6,451,445 | B1 | 9/2002 | Ito et al. |
| 2009/0270584 | A1 | 10/2009 | Endo et al. |
| 2012/0043248 | A1 | 2/2012 | Haruta et al. |
| 2013/0008821 | A1 | 1/2013 | Haruta et al. |
| 2017/0021601 | A1 | 1/2017 | Haruta et al. |
| 2018/0319539 | A1 | 11/2018 | Haruta et al. |
| 2019/0375552 | A1 | 12/2019 | Haruta et al. |
| 2020/0207934 | A1 | 7/2020 | Inoue et al. |
| 2021/0024708 | A1 | 1/2021 | Ishimaru et al. |
| 2021/0214583 | A1 | 7/2021 | Kaneko et al. |
| 2021/0246301 | A1 | 8/2021 | Ishimaru et al. |
| 2022/0049049 | A1 | 2/2022 | Nakagawa et al. |

FOREIGN PATENT DOCUMENTS

| | | | |
|---|---|---|---|
| CN | 101500784 | A | 8/2009 |
| CN | 106163768 | A | 11/2016 |
| CN | 107921698 | A | 4/2018 |
| CN | 108140339 | A | 6/2018 |
| CN | 110291130 | A | 9/2019 |
| CN | 111918909 | A | 11/2020 |
| JP | 2000327806 | A | 11/2000 |
| JP | 2003-082128 | A | 3/2003 |
| JP | 2012-36273 | A | 2/2012 |
| JP | 2015199337 | A | 11/2015 |
| JP | 2019-178194 | A | 10/2019 |
| WO | 2010137240 | A1 | 12/2010 |
| WO | 2011114934 | A1 | 9/2011 |
| WO | 2019/230843 | A1 | 12/2019 |
| WO | 2020080051 | A1 | 4/2020 |

*Primary Examiner* — Gregory Listvoyb
(74) *Attorney, Agent, or Firm* — Renner, Kenner; Arthur M. Reginelli

(57) ABSTRACT

Provided is a heat-shrinkable polyester film which undergoes less change in the physical properties even in a high-humidity environment, has excellent storage stability, and effectively suppresses a breakage phenomenon of the film after heat shrinkage.
Disclosed is a heat-shrinkable polyester film derived from a polyester resin, in which when tensile strengths in a main shrinkage direction obtained before and after immersion in water at 23 °C for 168 hours in a tensile test as measured according to JIS K 7127 are designated as C1 (MPa) and C2 (MPa), the following Relational Expression (1) is satisfied:

$$-5.3<(C2-C1)<4.2 \quad (1).$$

13 Claims, 9 Drawing Sheets

HEAT-SHRINKABLE POLYESTER FILM

TECHNICAL FIELD

The present invention relates to a heat-shrinkable polyester film (sometimes called as a polyester-based shrink film etc.).

More particularly, the invention relates to a heat-shrinkable polyester film that undergoes less change in physical properties such as tensile strength even in a high-humidity environment, has excellent storage stability, and also has excellent breakage resistance characteristics.

BACKGROUND ART

In recent years, the environmental impact of plastic waste tends to be viewed as a problem.

Therefore, attempts have been made on recycling of used plastics and simplification and volume reduction of plastic packaging materials, and furthermore, attempts have been made to switch to or promote materials with less environmental load.

In this regard, although heat-shrinkable polyester films are used as shrink labels for PET bottles and the like, heat-shrinkable polyester films have a problem that physical properties change due to deterioration over time, so that after a shrink label is mounted on a bottle by causing the label to shrink, the label breaks during transportation and storage.

Thus, in order to prevent breakage of labels, there has been proposed a heat-shrinkable polyester-based film suitable for label applications, which has excellent shrinkage characteristics in a wide temperature range from low temperature to high temperature, causes very low occurrence of shrinkage whitening, shrinkage spots, wrinkles, distortion, tight ends, and the like, and has excellent tear resistance and solvent adhesiveness (see, for example, Patent Document 1).

More specifically, with regard to the heat-shrinkable polyester-based film, the proportion of 1,4-cyclohexanedimethanol component is 10 mol % or more and 50 mol % or less in 100 mol % of polyhydric alcohol components. Furthermore, when a sample of a heat-shrinkable polyester-based film cut out into a square shape having a size of 10 cm×10 cm is immersed in hot water at 85 °C for 10 seconds, pulled up, subsequently immersed in water at 25 °C for 10 seconds, and pulled up, the heat shrinkage rate in the maximum shrinkage direction is 20% or more. Moreover, it is a heat-shrinkable polyester-based film characterized in that the limiting viscosity of the heat-shrinkable polyester-based film is 0.66 dl/g or more.

CITATION LIST

Patent Document

Patent Document 1: JP 2003-082128 A (claims and the like)

SUMMARY OF THE INVENTION

Problem to be Solved by the Invention

However, with regard to the heat-shrinkable polyester-based film described in Patent Document 1, deterioration over time in a high-humidity environment is not taken into consideration. Therefore, in a high-humidity environment, physical properties (for example, tensile strength, breakage resistance characteristics, and the like) of the film may change due to deterioration over time, resulting in deterioration of the storage stability and breakage resistance characteristics, and after the heat-shrinkable polyester-based film is produced as a label and is mounted on a bottle by causing the film to shrink, the label may break during transportation and storage.

Thus, the inventors of the present invention found that with regard to a heat-shrinkable polyester film, when the difference (C2−C1) between tensile strength C1 and tensile strength C2 in the TD direction before and after an aging treatment in a predetermined high-humidity environment is set to be equal to or less than a predetermined value, changes in the physical properties in a high-humidity environment are suppressed, and excellent breakage resistance characteristics and the like are exhibited, thus completing the present invention.

That is, an object of the present invention is to provide a heat-shrinkable polyester film that undergoes less change in physical properties in a high-humidity environment, has excellent storage stability, and also has excellent breakage resistance characteristics.

Means for Solving Problem

According to the present invention, a heat-shrinkable polyester film derived from a polyester resin, in which when tensile strengths in a main shrinkage direction (TD direction) obtained before and after immersion in water at 23 °C for 168 hours in a tensile test measured according to JIS K 7127 are designated as C1 (MPa) and C2 (MPa), the heat-shrinkable polyester film satisfies the following Relational Expression (1), is provided, and the above-described problems can be solved.

$$-5.3<(C2-C1)<4.2 \quad (1)$$

That is, by limiting the numerical value represented by C2−C1 to a value within a predetermined range in this way, the changes in physical properties of the film are reduced while excellent storage stability is obtained even in a high-humidity environment, and satisfactory breakage resistance characteristics can also be exhibited.

Incidentally, the breakage resistance characteristics as physical property of the film, for example, in Evaluation 12 (breakage resistance characteristics) of Example 1, among five test specimens produced from the heat-shrinkable polyester film of the present invention and aging-treated in a predetermined high-humidity environment, when the number of test specimens causing a breakage phenomenon is 0 or 1 or less, the breakage resistance characteristics are said to be satisfactory.

Furthermore, on the occasion of configuring the heat-shrinkable polyester film of the present invention, when satisfying the Relational Expression (1) is designated as configuration (a), it is preferable that the heat-shrinkable polyester film satisfies not only the configuration (a) but also the following configurations (b) and (c).

(b) When the main shrinkage direction is designated as TD direction, and a heat shrinkage rate in the TD direction in a case where the heat-shrinkable polyester film is caused to shrink under the conditions of 10 seconds in hot water at 90 °C is designated as A1, A1 is set to a value of 60% or more.

(c) When a direction orthogonally intersecting the TD direction is designated as MD direction, and a heat shrinkage rate in the MD direction in a case where the heat-shrinkable polyester film is caused to shrink under the conditions of 10 seconds in hot water at 90 °C is designated as B1, B1 is set to a value of below 10%.

As the configurations (b) and (c) are satisfied in this way, stable heat shrinkage is obtained in a predetermined temperature range in the heat-shrinkable polyester film during heat shrinkage. In addition, when this film is applied to a PET bottle or the like as a label, breakage of the label occurring due to the balance relationship between the heat shrinkage rates in the TD direction and the MD direction can be prevented, and satisfactory breakage resistance characteristics can also be obtained.

Furthermore, on the occasion of configuring the heat-shrinkable polyester film of the present invention, it is preferable that heat shrinkage rate A1, heat shrinkage rate B1, tensile strength C1, and tensile strength C2 satisfy the following Relational Expression (2).

$$-13 \leqq \frac{C2 - C1}{\left(1 - \frac{A1}{100}\right) \times \left(1 - \frac{B1}{100}\right)} \leqq 9.5 \tag{2}$$

By specifically limiting a numerical value represented by (C2−C1)/{(1−A1/100)×(1−B1/100)} to a value in a predetermined range in this way, the numerical value represented by C2−C1 can be more easily controlled to a value within a predetermined range, and at the same time, breakage of a label occurring due to the balance relationship between the heat shrinkage rates in the TD direction and the MD direction can be further prevented. In addition, the storage stability and breakage resistance characteristics can be further improved.

Furthermore, on the occasion of configuring the heat-shrinkable polyester film of the present invention, it is preferable that tensile strength C1 is a value within the range of 50 to 75 MPa, and tensile strength C2 is a value within the range of 50 to 75 MPa.

By specifically limiting the tensile strengths C1 and C2 to values within predetermined ranges in this way, the numerical value represented by C2−C1 can be more easily controlled to a value within a predetermined range, and in addition, the storage stability and breakage resistance characteristics can be further improved.

Furthermore, on the occasion of configuring the heat-shrinkable polyester film of the present invention, it is preferable that tensile strength C1 and tensile strength C2 satisfy the following Relational Expression (3).

$$0.95 \leqq \frac{C1}{C2} \leqq 1.07 \tag{3}$$

By specifically limiting the numerical value represented by C1/C2 to a value within a predetermined range in this way, the numerical value represented by C2−C1 can be more easily controlled to be within a predetermined range, and in addition, the storage stability and breakage resistance characteristics can be further improved.

Furthermore, on the occasion of configuring the heat-shrinkable polyester film of the present invention, when the heat shrinkage rate in a case where the heat-shrinkable polyester film is caused to shrink under the conditions of 10 seconds in hot water at 98 °C is designated as A2, it is preferable to set A2 to a value of 70% or more, and when the heat shrinkage rate in the MD direction in a case where the heat-shrinkable polyester film is caused to shrink under the conditions of 10 seconds in hot water at 98 °C is designated as B2, it is preferable to set B2 to a value of below 10%.

By specifically limiting the heat shrinkage rate A2 to a value equal to or more than a predetermined value and the heat shrinkage rate B2 to a value of below a predetermined value in this way, stable heat shrinkage can be obtained in a wider heat shrinkage temperature region (for example, 70 °C to 100 °C; hereinafter, the same temperature condition) through the relationship of heat shrinkage rate between the heat shrinkage rates A1 and B1 at 90 °C. In addition, when the film is applied to a PET bottle or the like as a label, breakage of the label occurring due to the balance relationship between the heat shrinkage rates in the TD direction and the MD direction can be prevented in a wider heat shrinkage temperature region, and satisfactory breakage resistance characteristics can also be obtained.

Furthermore, on the occasion of configuring the heat-shrinkable polyester film of the present invention, it is preferable that the following Relational Expression (4) is satisfied from the heat shrinkage rate A1 and the heat shrinkage rate A2.

$$(A2-A1) \leqq 5 \tag{4}$$

By specifically limiting the numerical value represented by A2−A1 to a value equal to or less than a predetermined value in this manner, the heat shrinkage rate in the TD direction can be more easily controlled in a wider heat shrinkage temperature region. Therefore, in a wider heat shrinkage temperature region, when the film is applied to a PET bottle or the like as a label, even in a case where the heat shrinkage rate in the MD direction varies to some extent, breakage of the label occurring due to the balance relationship between the heat shrinkage rates in the TD direction and the MD direction can be prevented by adjusting the heat shrinkage rate in the TD direction, and satisfactory breakage resistance characteristics can also be obtained.

Furthermore, on the occasion of configuring the heat-shrinkable polyester film of the present invention, it is preferable that a haze value of the film before shrinkage as measured according to JIS K 7105 is set to a value of 5% or less.

By specifically limiting the haze value to a value within a predetermined range in this way, the transparency of the heat-shrinkable polyester film can also be easily controlled in a quantitative manner, and since transparency is satisfactory, the general-purpose usability can be further enhanced.

Furthermore, on the occasion of configuring the heat-shrinkable polyester film of the present invention, it is preferable that the heat-shrinkable polyester film includes a non-crystalline polyester at a proportion in the range of 90% to 100% by weight of the total amount of resins.

By specifically limiting the content of a non-crystalline polyester resin in this way, the heat shrinkage rate and anti-breakage properties near the shrinkage temperature (for example, 80 °C to 90 °C; hereinafter, the same) can be improved, and at the same time, the haze value and the like can also be easily controlled in a quantitative manner.

Incidentally, the residue of the non-crystalline polyester resin in the total amount of resins is the value contributed by a crystalline polyester resin and a resin other than polyester resins.

MODE(S) FOR CARRYING OUT THE INVENTION

First Embodiment

According to a first embodiment, as illustrated in FIG. 1, there is provided a heat-shrinkable polyester film 10 derived from a polyester resin, in which when the tensile strengths in the main shrinkage direction obtained before and after immersion in water at 23 °C for 168 hours in a tensile test measured according to JIS K 7127 are designated as C1 (MPa) and C2 (MPa), the heat-shrinkable polyester film satisfies the following Relational Expression (1), and the above-described problems can be solved.

$$-5.3<(C2-C1)<4.2 \quad (1)$$

Figure 1A:
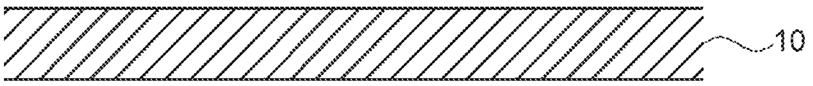
FIGS. 1A to 1C are each a diagram for illustrating the form of a heat-shrinkable polyester film.

Hereinafter, the configuration of the heat-shrinkable polyester film of the first embodiment will be divided, and various parameters and the like will be specifically described with appropriate reference to FIGS. 1A to 1C and the like.

1. Polyester Resin

Basically, the type of the polyester resin does not matter; however, usually, it is preferable that the polyester resin is a polyester resin formed from a diol and a dicarboxylic acid; a polyester resin formed from a diol and a hydroxycarboxylic acid; a polyester resin formed from a diol, a dicarboxylic acid, and a hydroxycarboxylic acid; or a mixture of these polyester resins.

Here, regarding the diol as a compound component of the polyester resin, at least one of aliphatic diols such as ethylene glycol, diethylene glycol, propanediol, butanediol, neopentyl glycol, and hexanediol; alicyclic diols such as 1,4-hexanedimethanol; aromatic diols; and the like may be mentioned.

Among these, ethylene glycol, diethylene glycol, and 1,4-hexanedimethanol are particularly preferred.

Furthermore, similarly, regarding the dicarboxylic acid as a compound component of the polyester resin, at least one of fatty acid dicarboxylic acids such as adipic acid, sebacic acid, and azelaic acid; aromatic dicarboxylic acids such as terephthalic acid, naphthalenedicarboxylic acid, and isophthalic acid; alicyclic dicarboxylic acids such as 1,4-cyclohexanedicarboxylic acid; ester-forming derivatives of these; and the like may be mentioned.

Among these, terephthalic acid is particularly preferred.

Furthermore, similarly, regarding the hydroxycarboxylic acid as a compound component of the polyester resin, at least one of lactic acid, hydroxybutyric acid, polycaprolactone, and the like may be mentioned.

Furthermore, as the non-crystalline polyester resin, for example, a non-crystalline polyester resin formed from dicarboxylic acids including at least 80 mol % of terephthalic acid; and diols including 50 mol % to 80 mol % of ethylene glycol and 20 mol % to 50 mol % of one or more diols selected from 1,4-cyclohexanedimethanol, neopentyl glycol, and diethylene glycol, can be suitably used. In order to change properties of the film as necessary, other dicarboxylic acids and diols, or hydroxycarboxylic acids may also be used. Furthermore, the non-crystalline polyester resins may be used singly or as a mixture.

On the other hand, examples of the crystalline polyester resin include polyethylene terephthalate, polyethylene naphthalate, polybutylene terephthalate, polybutylene naphthalate, and polypropylene terephthalate, and the crystalline polyester resins may be used singly or as a mixture.

Furthermore, when the polyester resin is a mixture of a non-crystalline polyester resin and a crystalline polyester resin, in order to obtain satisfactory heat resistance, shrinkage rate, and the like, it is preferable to set the blending amount of the non-crystalline polyester resin to a value within the range of 90% to 100% by weight, and more preferably to a value within the range of 91% to 100% by weight, with respect to the total amount of the resins constituting the heat-shrinkable polyester film.

2. Configuration (a)

Configuration (a) is a necessary configuration requirement for the heat-shrinkable polyester film of the first embodiment to the effect that when the tensile strengths in the TD direction obtained before and after immersion in water at 23 °C for 168 hours in a tensile test measured according to JIS K 7127 are designated as C1 (MPa) and C2 (MPa), a predetermined Relational Expression (1) is satisfied.

The reason for this is that changes in physical properties of the film in a high-humidity environment can be suppressed, and excellent storage stability and breakage resistance characteristics can be obtained.

More specifically, it is because when the numerical value represented by C2–C1 has a value of −5.3 MPa or less or a value of 4.2 MPa or more, changes in physical properties of the film in a high-humidity environment may not be sufficiently suppressed, and not only storage stability may not be obtained, but the breakage resistance characteristics also may not be exhibited.

Therefore, it is more preferable to set such numerical value represented by C2–C1 to a value of above −4.6 MPa, which is also a value of below 3.4 MPa, and even more preferably to a value of above −3.9 MPa, which is also a value of below 2.6 MPa.

Here, referring to FIG. 2, the tensile strengths C1 and C2 in the TD direction obtained before and after an aging treatment of the film under predetermined conditions (immersion in water at 23 °C for 168 hours) will be described by using a typical example of an SS curve in the TD direction for the heat-shrinkable polyester film.

Figure 2:
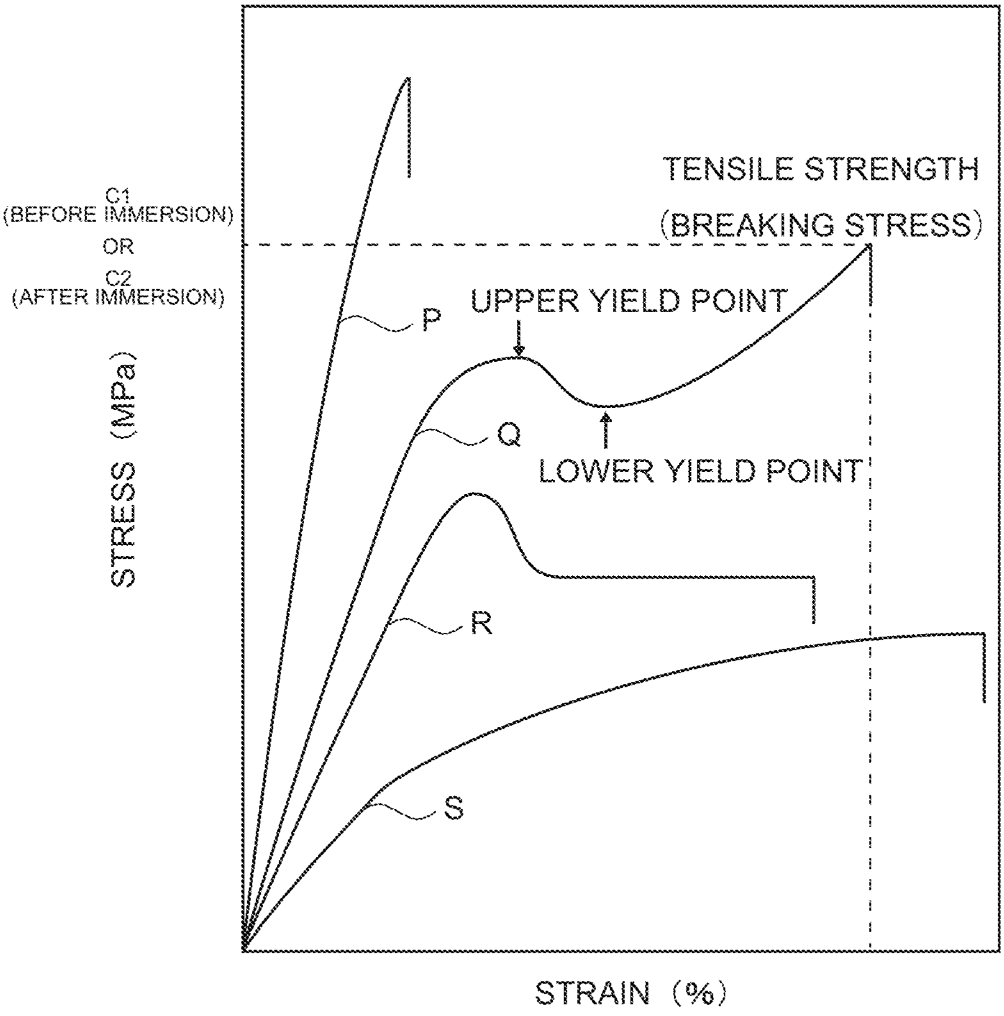
FIG. 2 is a diagram showing a typical example of an SS curve in the TD direction for a heat-shrinkable polyester film, the diagram being intended for describing tensile strengths C1 and C2 in the TD direction before and after an aging treatment of the film under predetermined conditions (immersion for 168 hours in water at 23 °C)

That is, the axis of abscissa in FIG. 2 represents the value (%) of strain in the TD direction of the heat-shrinkable polyester film, and the axis of ordinate represents stress (MPa) corresponding to the strain.

Among such characteristic curves P to S in FIG. 2, the heat-shrinkable polyester film of the first embodiment is usually considered to correspond to the characteristic curve Q.

According to this characteristic curve Q, it is understood that when the strain in the TD direction of the heat-shrinkable polyester film is increased, stress is generated corresponding thereto, and the value thereof also increases.

Next, when the strain in the TD direction is increased, crystal transition occurs in the heat-shrinkable polyester film, and an upwardly convex broad peak appears. This is defined as upper yield point.

Next, when the strain in the TD direction is further increased, crystal transition occurs again in the heat-shrinkable polyester film, and a downwardly convex broad peak appears. This is defined as lower yield point.

Next, when the strain in the TD direction is further increased, the value of stress also increases correspondingly thereto, breakage of the heat-shrinkable polyester film occurs at a certain strain, and the stress corresponding to this strain, which is the maximum stress on the SS curve, is defined as tensile strength (may also be referred to as breaking stress).

Furthermore, when the characteristic curve of the heat-shrinkable polyester film of the first embodiment becomes a curve close to the characteristic curve P or S, the tensile strength means breaking stress, and when the characteristic curve becomes a curve close to the characteristic curve R, tensile strength means the upper yield point stress, which is the stress at the upper yield point.

The present invention has a feature that the predetermined relationship between the difference of tensile strengths (C2–C1) obtained before and after an aging treatment under predetermined conditions and the breakage resistance characteristics and the like is found, and the predetermined relationship is controlled.

Figure 3:
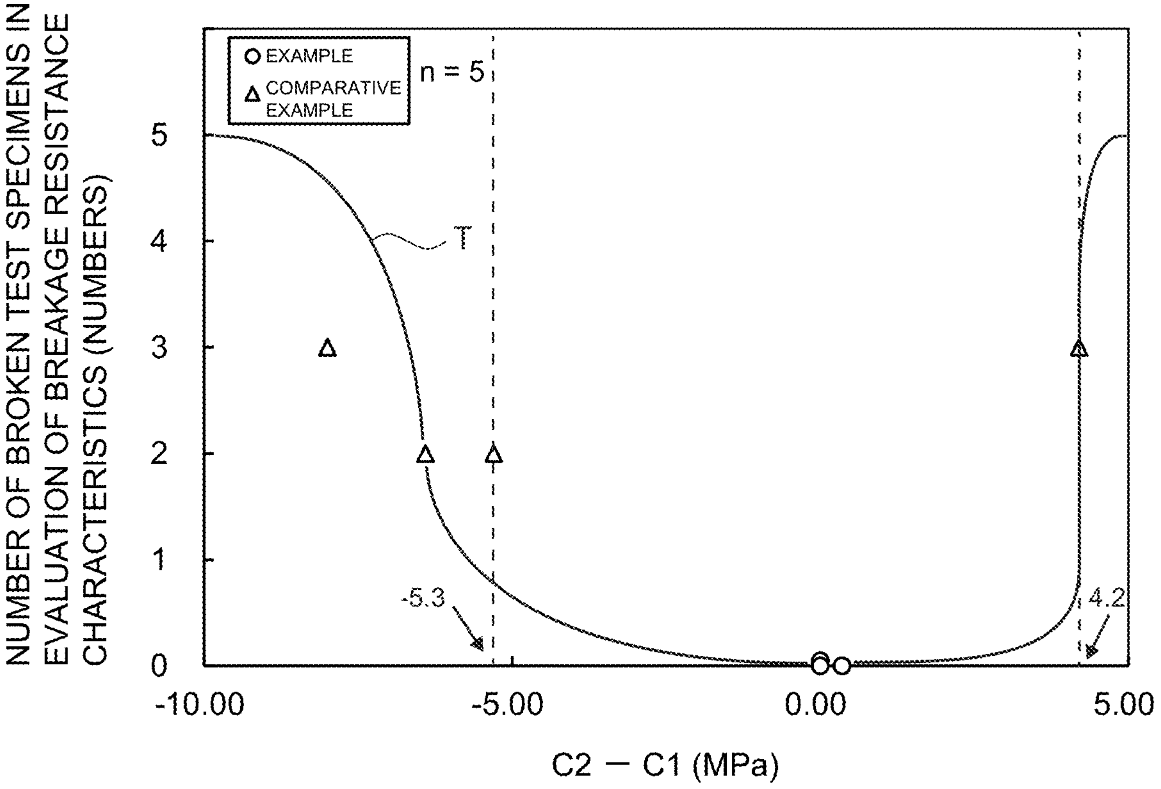
FIG. 3 is a diagram for illustrating the relationship between the difference (C2−C1) between tensile strength C2 and tensile strength C1 in the TD direction of a heat-shrinkable polyester film and the number of test specimens (n=5) in which a breakage phenomenon has occurred in an evaluation of breakage resistance characteristics.

Next, referring to FIG. 3, by plotting the difference (C2–C1) between tensile strengths C1 and C2 obtained before and after an aging treatment of the heat-shrinkable polyester film under predetermined conditions (immersion in water at 23 °C for 168 hours) on the axis of abscissa, and plotting the value of the number of test specimens in which a breakage phenomenon has occurred among five test specimens in the evaluation of breakage resistance characteristics on the axis of ordinate, the relationship of these will be described.

From such a characteristic curve in FIG. 3, it is understood that when the lower limit of the value represented by C2–C1 is a value of above −5.3 MPa, the number of test specimens in which a breakage phenomenon has occurred in the evaluation of breakage resistance characteristics is 1 or less, satisfactory anti-breakage properties are exhibited.

In contrast, it is understood that when the lower limit of the value represented by C2–C1 is a value of −5.3 MPa or less, the number of test specimens in which a breakage phenomenon has occurred is above 1, and sufficient breakage resistance characteristics are not exhibited.

Furthermore, it is understood that when the upper limit of the value represented by C2–C1 is a value of below 4.2 MPa, the number of test specimens in which a breakage phenomenon has occurred in the evaluation of breakage resistance characteristics rapidly decreases and becomes 1 or less, and satisfactory anti-breakage properties are exhibited.

In contrast, it is understood that when the upper limit of the value represented by C2–C1 is a value of 4.2 MPa or more, the number of test specimens in which a breakage phenomenon has occurred rapidly increases and becomes 3 or more, and therefore, sufficient breakage resistance characteristics are not exhibited.

Next, referring to FIG. 4, by plotting the difference (C2–C1) between tensile strengths C1 and C2 obtained before and after an aging treatment of the heat-shrinkable polyester film under predetermined conditions (immersion in water at 23 °C for 168 hours) on the axis of abscissa, and plotting the value (relative value) of the breakage resistance characteristics evaluation on the axis of ordinate, the relationship of these will be described.

That is, the values (relative values) of the breakage resistance characteristics evaluation were calculated by taking ⊙ of the breakage resistance characteristics evaluation as 5, ○ as 3, Δ as 1, and X as 0.

Figure 4:
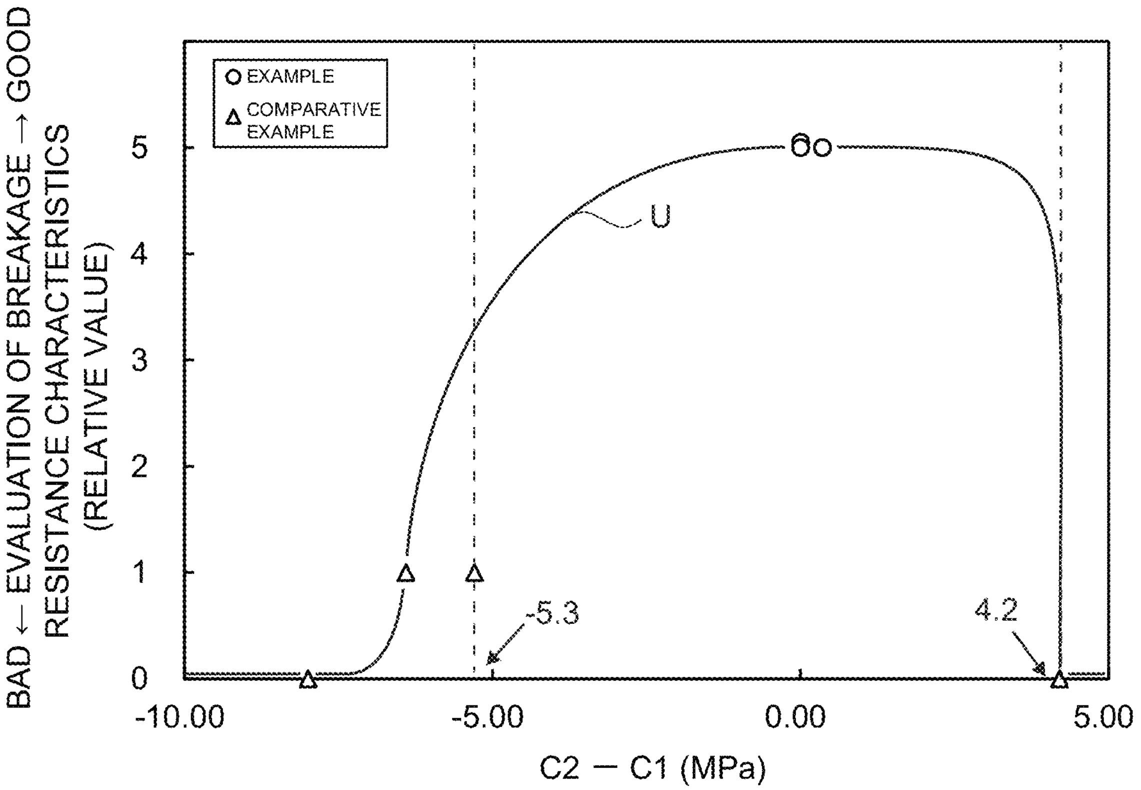
FIG. 4 is a diagram for illustrating the relationship between the difference (C2−C1) between tensile strength C2 and tensile strength C1 in the TD direction of a heat-shrinkable polyester film and the evaluation (relative value) of breakage resistance characteristics.

From such a characteristic curve in FIG. 4, it is understood that when the lower limit of the value represented by C2–C1 is a value of above −5.3 MPa, the value (relative value) of the breakage resistance characteristics evaluation becomes 3 or more, and satisfactory breakage resistance characteristics are exhibited.

In contrast, it is understood that the lower limit of the value represented by C2–C1 is −5.3 MPa or less, the value (relative value) of the breakage resistance characteristics evaluation rapidly decreases, and sufficient breakage resistance characteristics are not exhibited.

Furthermore, it is understood that when the upper limit of the value represented by C2–C1 is below 4.2 MPa, the value (relative value) of the breakage resistance characteristics evaluation rapidly increases and becomes 3 or more, and satisfactory breakage resistance characteristics are exhibited.

In contrast, it is understood that when the upper limit of the value represented by C2–C1 is 4.2 MPa or more, the value (relative value) of the breakage resistance characteristics evaluation is 0, and sufficient breakage resistance characteristics are not exhibited.

Incidentally, in the present evaluation, it has been separately found that when a heat-shrinkable polyester film in which satisfactory breakage resistance characteristics are exhibited is used, after the heat-shrinkable polyester film is produced as a label and is mounted on a bottle by causing the film to shrink, the label does not break during transportation and storage.

Next, FIG. 5 will be described. That is, FIG. 5A is a diagram (photograph) corresponding to Example 1 and showing the state of a test specimen in a case where breakage has not occurred.

More specifically, through a tensile test of using a test specimen cut out from a heat-shrinkable polyester film after an aging treatment under predetermined conditions (immersion in water at 23 °C for 168 hours), it is understood that even when the tensile portion of the test specimen was stretched, breakage did not occur.

Figure 5A:
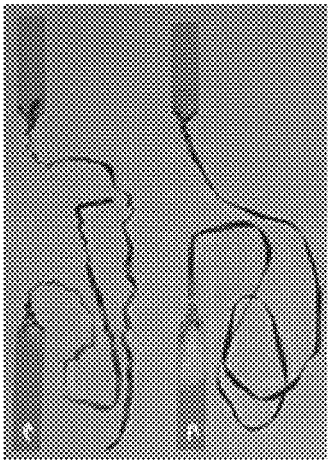
FIG. 5A is a diagram (photograph) corresponding Example 1 and showing the state of a test specimen in a case where a breakage phenomenon has not occurred.
Figure 5B:
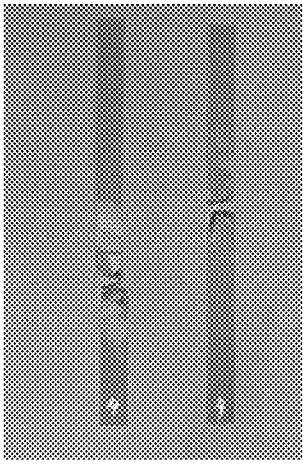
FIG. 5B is a diagram (photograph) corresponding to Comparative Example 1 and showing the state of a test specimen in a case where a breakage phenomenon has occurred.

On the other hand, FIG. 5B is a photograph corresponding to Comparative Example 1 and showing the state of a test specimen in a case where breakage has occurred.

More specifically, through a tensile test of using a test specimen cut out from a heat-shrinkable polyester film after an aging treatment under predetermined conditions (immersion in water at 23 °C for 168 hours), it is understood that breakage occurred when the tensile portion of the test specimen was only slightly stretched, as compared with the case of the test specimen of FIG. 5A.

3. Optional Configuration Requirements (1) Configuration (b)

It is a configuration requirement related to a heat shrinkage rate A1 in a case where the main shrinkage direction is designated as TD direction, and the heat-shrinkable polyester film is caused to shrink in the TD direction under the conditions of 10 seconds in hot water at 90 °C, and it is a suitable embodiment to set the heat shrinkage rate A1 to a value of 60% or more.

The reason for this is that by specifically limiting such 90 °C heat shrinkage rate A1 to be equal to or more than a predetermined value, stable heat shrinkage is obtained in the heat-shrinkable polyester film during heat shrinkage, and in addition, from the relationship with the heat shrinkage rate B1 in the MD direction, which will be described below, breakage of the label occurring due to the balance relationship between the heat shrinkage rates in the TD direction and the MD direction can be prevented while satisfactory breakage resistance characteristics can be obtained.

More specifically, it is because when the 90 °C heat shrinkage rate A1 of the film has a value of below 60%, at the time of producing the film as a label and applying the label to a PET bottle or the like, the heat shrinkage rate may be insufficient depending on the shape of the PET bottle, and not only stable heat shrinkage may not be obtained, but from the relationship with the heat shrinkage rate B1 in the MD direction, the breakage of the label occurring due to the balance relationship between the heat shrinkage rates in the TD direction and the MD direction also may not be prevented.

Therefore, it is more preferable to set the lower limit of such 90 °C heat shrinkage rate A1 to a value of 65% or more, and even more preferably to a value of 70% or more.

On the other hand, it is because when the value of the above-mentioned 90 °C heat shrinkage rate A1 becomes excessively large, a desired heat shrinkage rate may not be obtained in a predetermined heat shrinkage temperature region (for example, 70 °C to 100 °C), and not only stable heat shrinkage may not be obtained, but when the film is produced as a label and applied to a PET bottle or the like, from the relationship with the heat shrinkage rate B1 in the MD direction, breakage of the label occurring due to the balance relationship between the heat shrinkage rates in the TD direction and the MD direction may not be prevented.

Therefore, it is preferable to set the upper limit of such 90 °C heat shrinkage rate A1 to a value of 85% or less, more preferably to a value of 83% or less, and even more preferably to a value of 81% or less.

Incidentally, the heat shrinkage rate in the shrink film of the first embodiment is defined by the following Formula (5).

$$\text{Heat shrinkage rate (\%)} = \frac{L_0 - L_1}{L_0} \times 100 \tag{5}$$

$L_0$: Dimension of sample before heat treatment (longitudinal direction or width direction)

$L_1$: Dimension of sample after heat treatment (same direction as that of $L_0$)

(2) Configuration (c)

Configuration (c) is a configuration requirement related to a heat shrinkage rate B1 in a case where a direction orthogonally intersecting the TD direction of the heat-shrinkable polyester film of the first embodiment is designated as MD direction, and the heat-shrinkable polyester film is caused to shrink in the MD direction under the conditions of 10 seconds in hot water at 90 °C, and it is a suitable embodiment to set the heat shrinkage rate B1 to a value of below 10%.

The reason for this is that by specifically limiting such heat shrinkage rate B1 to be below a predetermined value, when the film is produced as a label and applied to a PET bottle or the like, from the relationship with the heat shrinkage rate A1, breakage of the label occurring due to the balance relationship between the heat shrinkage rates in the TD direction and the MD direction can be prevented, and satisfactory breakage resistance characteristics can be obtained.

More specifically, it is because when the 90 °C heat shrinkage rate B1 of the film has a value of −5% or less or a value of 10% or more, from the relationship with the heat shrinkage rate A1, breakage of the label occurring due to the balance relationship between the heat shrinkage rates in the TD direction and the MD direction may not be prevented.

Therefore, it is more preferable to set such 90 °C heat shrinkage rate B1 to a value of above −4%, which is also a value of below 8%, and even more preferably to a value of above −3%, which is also a value of below 6%.

(3) Configuration (d)

Configuration (d) is a configuration requirement related to the thickness (average thickness) of the heat-shrinkable polyester film of the first embodiment, and usually, it is a suitable embodiment to set the thickness to a value within the range of 10 to 100 μm.

The reason for this is that by specifically limiting such thickness of the heat-shrinkable polyester film to a value within a predetermined range, even more satisfactory breakage resistance characteristics can be obtained.

More specifically, it is because when such thickness of the heat-shrinkable polyester film has a value of below 10 μm, as the mechanical strength is noticeably decreased, handling may be difficult, or it may be difficult for the heat-shrinkable polyester film to exhibit satisfactory breakage resistance characteristics.

On the other hand, it is because when such thickness of the heat-shrinkable polyester film has a value of above 100 μm, it may be difficult to produce the heat-shrinkable polyester film to have a uniform thickness, or when the heat-shrinkable polyester film is caused to thermally shrink at a predetermined temperature, the heat-shrinkable polyester film does not undergo uniform heat shrinkage, and furthermore, it may be difficult for the heat-shrinkable polyester film to exhibit satisfactory breakage resistance characteristics.

Therefore, as the configuration (d), it is more preferable to set the thickness of the film to a value within the range of 15 to 80 μm, and even more preferably to a value within the range of 20 to 60 μm.

(4) Configuration (e)

With regard to configuration (e), it is a suitable embodiment that heat shrinkage rate A1, heat shrinkage rate B1, tensile strength C1, and tensile strength C2 of the heat-shrinkable polyester film of the first embodiment satisfy a predetermined Relational Expression (2).

The reason for this is that by specifically limiting a numerical value represented by $(C2-C1)/\{(1-A1/100)\times(1-B1/100)\}$ (hereinafter, referred to as variable D) to a value within a predetermined range, it is easier to control the numerical value represented by C2−C1 to a value within a predetermined range, and the storage stability and breakage resistance characteristics can be even further improved.

More specifically, it is because when such variable D has a value outside the range of −13 to 9.5 MPa, it may be difficult to control the value represented by C2−C1, and it may be difficult for the heat-shrinkable polyester film to maintain excellent storage stability and breakage resistance characteristics.

Therefore, regarding the configuration requirement (e), it is more preferable to set such variable D to a value within the range of −8 to 6.5 MPa, and even more preferably to a value of −3 to 3.5 MPa or less.

Here, referring to FIG. 6, the relationship between the variable D and the numerical value represented by C2−C1 in the heat-shrinkable polyester film will be described.

Figure 6:
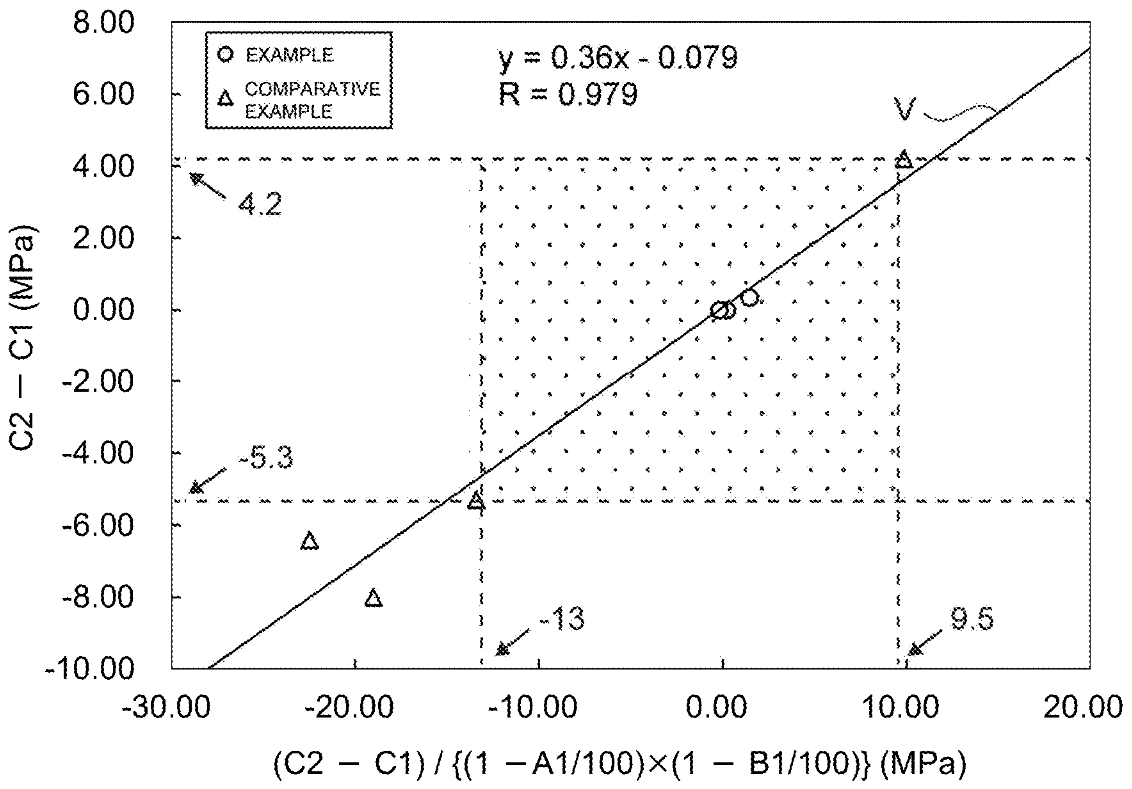
FIG. 6 is a diagram for illustrating the relationship between the expression: (C2−C1)/{(1−A1/100)×(1−B1/100)} represented by heat shrinkage rate A1 in the TD direction, heat shrinkage rate B1 in the MD direction, tensile strength C1 in the TD direction, and tensile strength C2 of a heat-shrinkable polyester film under predetermined heating conditions (hot water at 90 °C, for 10 seconds), and the difference (C2−C1) between tensile strength C2 and tensile strength C1.

That is, a characteristic curve is shown by plotting the variable D (MPa) of the heat-shrinkable polyester film on the axis of abscissa of FIG. 6 and plotting the value (MPa) represented by C2−C1 on the axis of ordinate. From such a characteristic curve, it is understood that there is a highly excellent correlation (correlation coefficient (R) is 0.979) in the relationship between the variable D and C2−C1. Therefore, by limiting the variable D to a value within a predetermined range, the value represented by C2−C1 can be more easily controlled.

Figure 7:
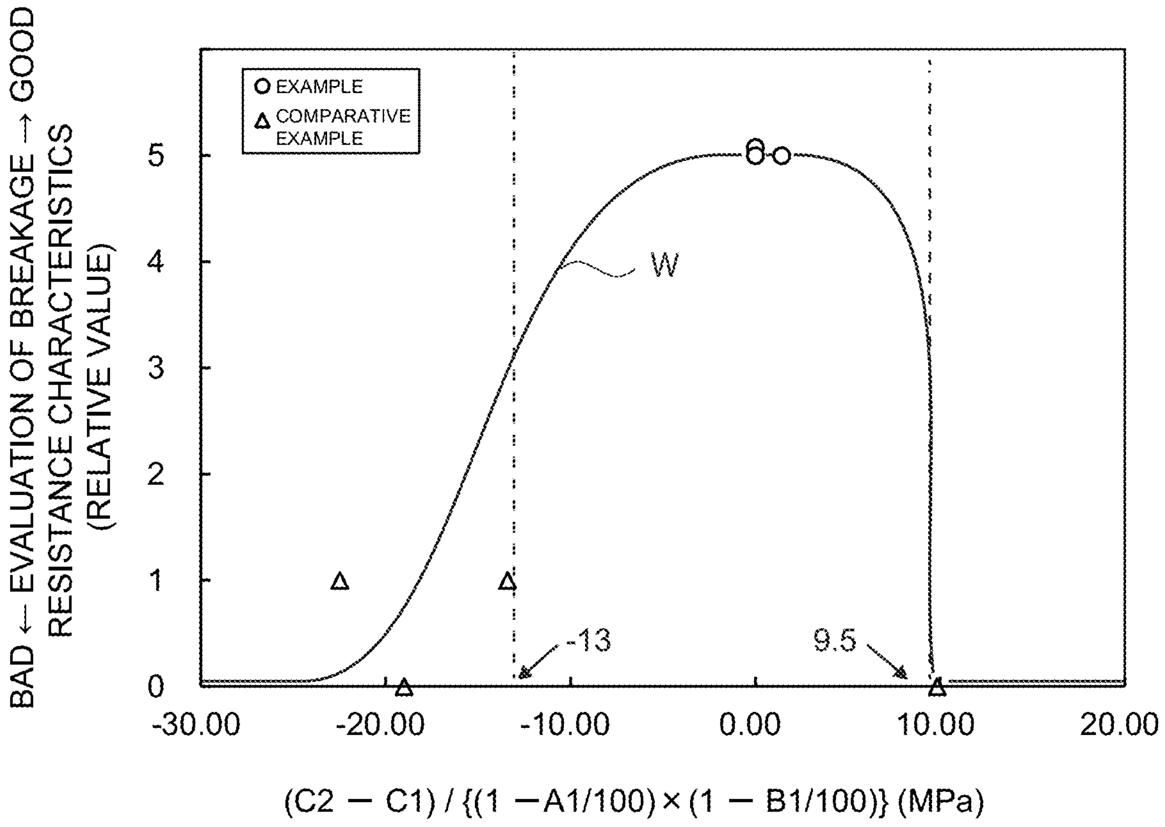
FIG. 7 is a diagram for illustrating the relationship between the expression: (C2−C1)/{(1−A1/100)×(1−B1/100)} represented by heat shrinkage rate A1 in the TD direction, heat shrinkage rate B1 in the MD direction, and tensile strength C1 in the TD direction, and tensile strength C2 of a heat-shrinkable polyester film under predetermined heating conditions (hot water at 90 °C, for 10 seconds), and the evaluation (relative value) of breakage resistance characteristics.

Next, FIG. 7 more specifically shows the relationship between the variable D and the breakage resistance characteristics evaluation.

That is, a characteristic curve is shown by plotting the variable D (MPa) of the heat-shrinkable polyester film on the axis of abscissa of FIG. 7 and plotting the evaluation (relative value) of the breakage resistance characteristics on the axis of ordinate. The evaluation (relative value) of the breakage resistance characteristics on the axis of ordinate represents quantification of ⊙ as 5, ○ as 3, Δ as 1, and X as 0.

From such a characteristic curve, it is understood that when the variable D has a value within the range of −13 to 9.5 MPa, the evaluation (relative value) of the breakage resistance characteristics is 3 or more, and satisfactory evaluation (relative value) of the breakage resistance characteristics is obtained.

In contrast, it is understood that when the variable D has a value outside the range of −13 to 9.5, the evaluation (relative value) of the breakage resistance characteristics is rapidly decreased, and sufficient breakage resistance characteristics are not exhibited.

(5) Configuration (f)

Configuration (f) is a configuration requirement related to tensile strength C1 and tensile strength C2 of the heat-shrinkable polyester film of the first embodiment, and it is a suitable embodiment to set C1 to a value within the range of 50 to 75 MPa and C2 to a value within the range of 50 to 75 MPa.

The reason for this is that by specifically limiting C1 and C2 to values within predetermined ranges, it is even easier to control the numerical value represented by C1−C2 to a value within a predetermined range, and furthermore, even after an aging treatment, the breakage resistance characteristics of the film can be maintained in a satisfactory state without deterioration of physical properties.

More specifically, it is because when the tensile strength C1 before an aging treatment in a predetermined high-humidity environment is below 50 MPa or above 75 MPa, the numerical value represented by C2−C1 may not be controlled to a value within a predetermined range.

Furthermore, similarly, it is because when the tensile strength C2 after an aging treatment in a predetermined high-humidity environment is below 50 MPa or above 75 MPa, the numerical value represented by C2−C1 may not be controlled to a value within a predetermined range.

Therefore, regarding the configuration (f), it is more preferable to set C1 to a value within the range of 48 to 72 MPa and C2 to a value within the range of 48 to 72 MPa, and it is even more preferable to set C1 to a value within the range of 51 to 69 MPa and C2 to a value within the range of 51 to 69 MPa.

(6) Configuration (g)

Configuration (g) is a configuration requirement related to C1/C2, which is the ratio of tensile strength C1 and tensile strength C2 of the heat-shrinkable polyester film of the first embodiment, and it is a suitable embodiment that the value represented by C1/C2 is value within the range of 0.95 to 1.07.

The reason for this is that by specifically limiting the numerical value represented by C1/C2 to a value within a predetermined range in this way, it is easy to control the numerical value represented by C2−C1 to be within a predetermined range, and furthermore, even after an aging treatment, the breakage resistance characteristics of the film can be maintained in a satisfactory state without deterioration of physical properties.

More specifically, it is because when the value represented by C1/C2, which is the ratio of tensile strength C1 and tensile strength C2, is below 0.95 or above 1.07, the numerical value represented by C2−C1 may not be controlled to a value within a predetermined range.

Therefore, regarding the configuration (g), it is more preferable to set the value represented by C1/C2 to a value within the range of 0.96 to 1.06, and even more preferably to a value within the range of 0.97 to 1.05.

Figure 8:
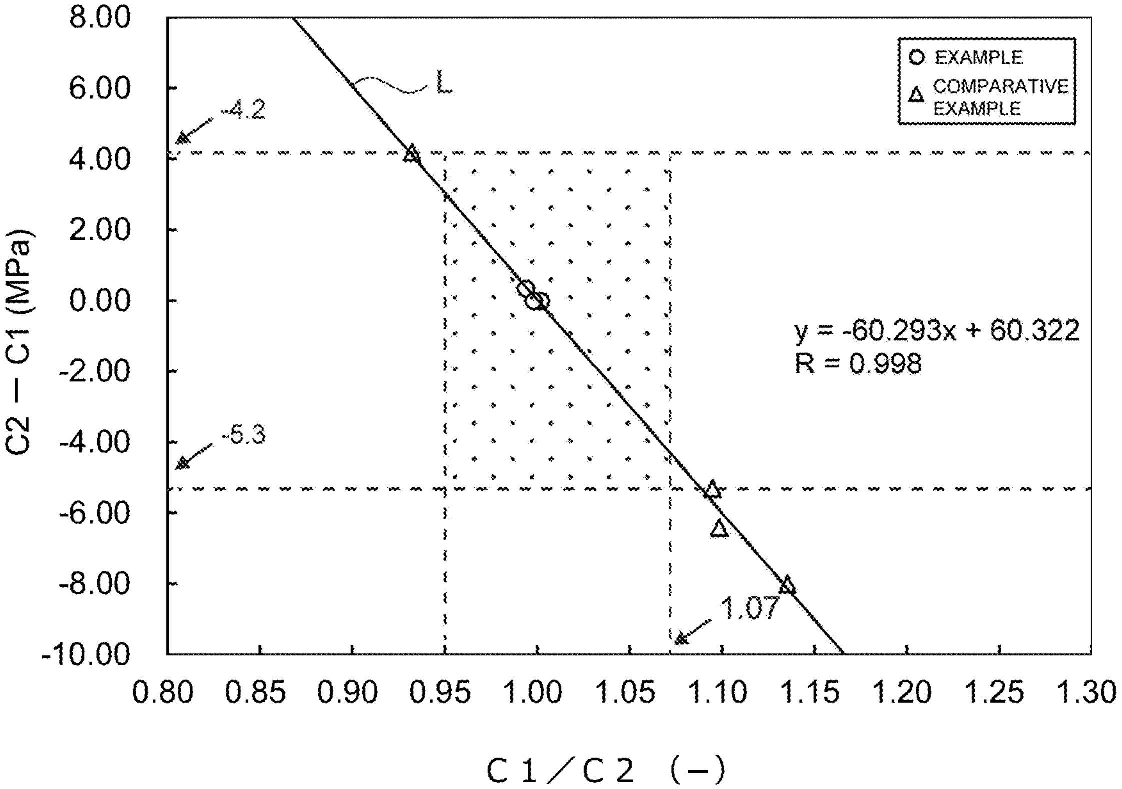
FIG. 8 is a diagram for illustrating the relationship between the ratio (C1/C2) between tensile strength C1 and tensile strength C2 in the TD direction of a heat-shrinkable polyester film, and the difference (C2−C1) between tensile strength C2 and tensile strength C1.

Here, referring to FIG. 8, the relationship between the numerical value represented by C1/C2 and the numerical value represented by C2−C1 for the heat-shrinkable polyester film is shown.

That is, a characteristic curve is shown by plotting the value (−) represented by C1/C2 for the heat-shrinkable polyester film on the axis of abscissa of FIG. 8 and plotting the value (MPa) represented by C2−C1 on the axis of ordinate.

From such a characteristic curve, it is understood that there is a highly excellent correlation (correlation coefficient (R) is 0.998) in the relationship between C1/C2 and C2−C1.

Therefore, by limiting C1/C2 to a value within a predetermined range, the value represented by C2−C1 can be more easily controlled.

Figure 9:
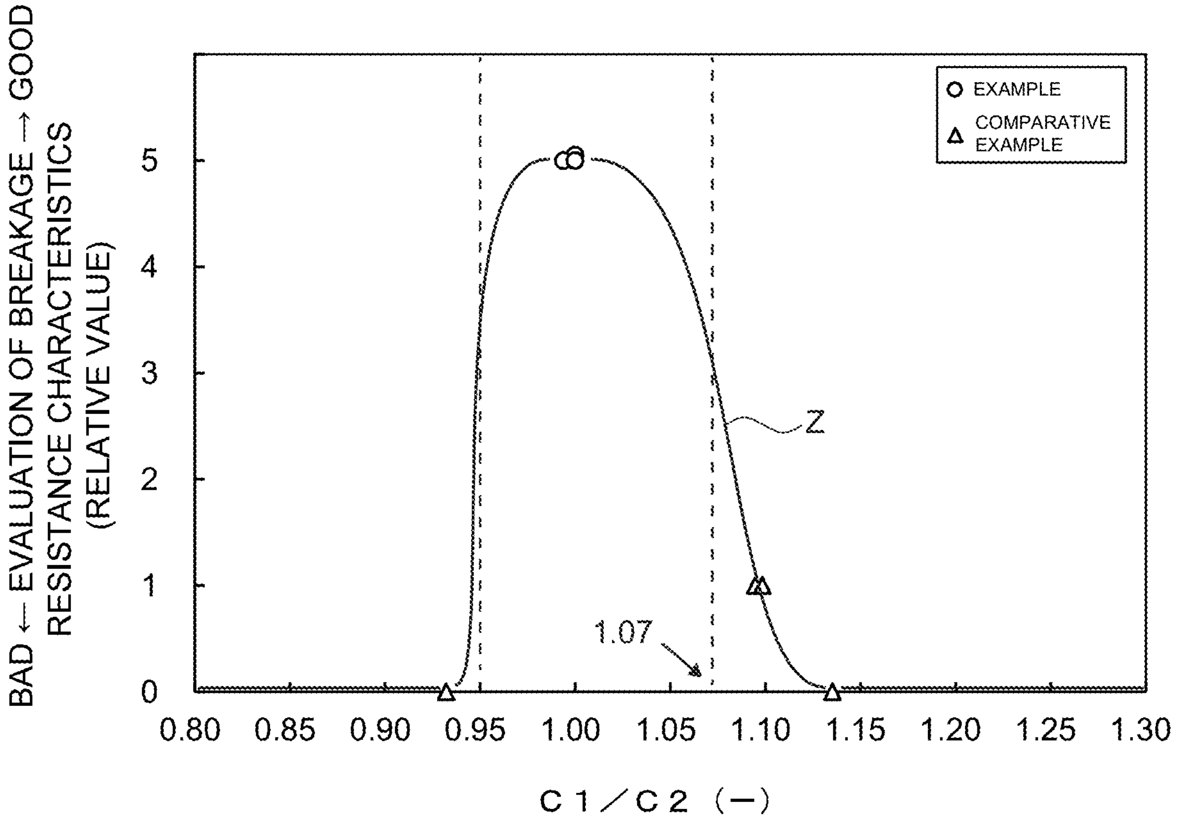
FIG. 9 is a diagram for illustrating the relationship between the ratio (C1/C2) between tensile strength C2 and tensile strength C1 in the TD direction of a heat-shrinkable polyester film, and the evaluation (relative value) of breakage resistance characteristics.

Next, the relationship between the numerical value represented by C1/C2 and the breakage resistance characteristics evaluation will be more specifically shown in FIG. 9.

That is, a characteristic curve is shown by plotting the numerical value (−) represented by C1/C2 for the heat-shrinkable polyester film on the axis of abscissa of FIG. 9 and plotting the evaluation (relative value) of the breakage resistance characteristics on the axis of ordinate. The evaluation (relative value) of the breakage resistance characteristics on the axis of ordinate represents quantification of ⊙ as 5, ○ as 3, Δ as 1, and X as 0.

From such a characteristic curve, it is understood that when the numerical value represented by C1/C2 is a value within the range of 0.95 to 1.07, the evaluation (relative value) of the breakage resistance characteristics is 3 or more, and satisfactory evaluation (relative value) of the breakage resistance characteristics is obtained.

In contrast, it is understood that when the numerical value represented by C1/C2 is a value outside the range of 0.95 to 1.07, the evaluation (relative value) of the breakage resistance characteristics is rapidly decreased, and sufficient breakage resistance characteristics are not exhibited.

(7) Configuration (h)

Configuration (h) is a configuration requirement related to the heat shrinkage rate A2 in the TD direction of the heat-shrinkable polyester film in a case where the heat-shrinkable polyester film is caused to shrink under the conditions of 10 seconds in hot water at 98 °C, and the heat shrinkage rate B2 in the MD direction in a case where the heat-shrinkable polyester film is caused to shrink under the conditions of 10 seconds in hot water at 98 °C, and it is a suitable embodiment to set A2 to a value of 70% or more and B2 to a value of below 10%.

The reason for this is that by specifically limiting A2 to be equal to or more than a predetermined value and B2 to be below a predetermined value in this way, from the relationship between the heat shrinkage rates A1 and B1 at 90 °C, stable heat shrinkage can be obtained in a wide heat shrinkage temperature region. In addition, in a wide heat shrinkage temperature region, when the film is produced as a label and applied to a PET bottle or the like, breakage of the label occurring due to the balance relationship between the heat shrinkage rates in the TD direction and the MD direction can be prevented, and satisfactory breakage resistance characteristics can also be obtained.

More specifically, it is because when the heat shrinkage rate A2 has a value outside the range of 70% to 90%, it may be difficult to control the heat shrinkage rate A1 to a value within a predetermined range.

On the other hand, it is because when the heat shrinkage rate B2 has a value of below 0% or 10% or more, it may be difficult to control the heat shrinkage rate B1 to a value within a predetermined range.

Therefore, regarding the configuration (h), it is more preferable to set the heat shrinkage rate A2 to a value within the range of 73% to 87% and the heat shrinkage rate B2 to a value within the range of 0% to 8%, and it is even more preferable to set the heat shrinkage rate A2 to a value within the range of 76% to 84% and the heat shrinkage rate B2 to a value within the range of 0% to 6%.

(8) Configuration (i)

With regard to configuration (i), it is a suitable embodiment that from the heat shrinkage rate A1 and the heat shrinkage rate A2, a predetermined Relational Expression (3) is satisfied.

The reason for this is that by specifically limiting the difference (A2−A1) between the heat shrinkage rates A1 and A2 to be equal to or less than predetermined values in this way, the difference can be controlled to be within a desired range of heat shrinkage rate in a wide heat shrinkage temperature region, and stable heat shrinkage can be obtained.

More specifically, it is because when the value represented by A2−A1 is more than 5%, a desired heat shrinkage rate may not be obtained in the heat shrinkage temperature region of 70 °C to 90 °C, and stable heat shrinkage may not be obtained.

Therefore, regarding the configuration (i), it is more preferable that the value represented by A2−A1 is 4% or less, and even more preferably 3% or less.

(9) Configuration (j)

Configuration (j) is a configuration requirement related to the stretch ratio in the MD direction (average MD direction stretch ratio; may be simply referred to as MD direction stretch ratio) of the heat-shrinkable polyester film before shrinkage.

It is a suitable embodiment to set such MD direction stretch ratio to a value within the range of 100% to 200%.

The reason for this is that by specifically limiting the MD direction stretch ratio to a value within a predetermined range in this way, and on the other hand, by specifically limiting each of A1, A2, B1, B2, C1, C2, and numerical values represented by combining these (for example, A2−A1 and the like) to a value within a predetermined range, excellent breakage resistance characteristics can be exhibited.

More specifically, it is because when the MD direction stretch ratio has a value of below 100%, the manufacturing yield may be noticeably decreased.

On the other hand, it is because when the MD direction stretch ratio is above 200%, the shrinkage rate in the TD direction may be affected, and adjustment of the shrinkage itself may be difficult.

Therefore, regarding the configuration (j), it is more preferable to set the MD direction stretch ratio to a value within the range of 100% to 180%, and even more preferably to a value within the range of 100% to 160%.

(10) Configuration (k)

Furthermore, configuration (k) is a configuration requirement related to the stretch ratio in the TD direction (average TD direction stretch ratio; may be simply referred to as TD direction stretch ratio) of the heat-shrinkable polyester film before heat shrinkage.

It is a suitable embodiment to set such TD direction stretch ratio to a value within the range of 300% to 600%.

The reason for this is that by specifically limiting the TD direction stretch ratio to a value within a predetermined range in this way, and by specifically limiting each of A1, A2, B1, B2, C1, C2, and numerical values represented by these (for example, A2−A1) to a value within a predetermined range, excellent breakage resistance characteristics can be exhibited.

More specifically, it is because when the TD direction stretch ratio has a value of below 300%, the shrinkage rate in the TD direction may be markedly decreased, and the use applications of the usable heat-shrinkable polyester film may be excessively limited.

On the other hand, it is because when the TD direction stretch ratio has a value of above 600%, the shrinkage rate becomes remarkably large, and the use applications of usable heat-shrinkable polyester film may be excessively limited, or it may be difficult to control the stretch ratio itself to be constant.

Therefore, regarding the configuration (k), it is more preferable to set the TD direction stretch ratio to a value within the range of 320% to 550%, and even more preferably to a value within the range of 340% to 500%.

(11) Configuration (m)

Furthermore, configuration (m) is an optional configuration requirement to the effect that the haze value of the heat-shrinkable polyester film before heat shrinkage as measured according to JIS K 7105 is set to a value of 5% or less.

The reason for this is that by specifically limiting the haze value to a value within a predetermined range in this way, it is easy to control the transparency of the heat-shrinkable polyester film in a quantitative manner, and since transparency is satisfactory, general-purpose usability can be further enhanced.

More specifically, it is because when the haze value of the film before heat shrinkage has a value of above 5%, transparency is decreased, and application of the heat-shrinkable polyester film to the decorative use and the like for PET bottles may be difficult.

On the other hand, it is because when the haze value of the film before heat shrinkage becomes excessively small, stable control may be difficult, and the manufacturing yield may be noticeably decreased.

Therefore, regarding the configuration (m), it is more preferable to set the haze value of the film before heat shrinkage to a value within the range of 0.1% to 3%, and even more preferably to a value within the range of 0.5% to 1%.

(12) Configuration (n)

Furthermore, configuration (n) is an optional configuration requirement to the effect that the heat-shrinkable polyester film of the first embodiment includes a non-crystalline polyester resin at a proportion of 90% to 100% by weight of the total amount.

The reason for this is that by specifically limiting the content of the non-crystalline polyester resin in this way, the heat shrinkage rate near the shrinkage temperature and anti-breakage properties can be more easily adjusted to desired ranges, and at the same time, the haze value and the like are also easily controllable in a quantitative manner.

More specifically, it is because when the content of the non-crystalline polyester resin has a value of below 90%, control of the shrinkage rate near the shrinkage temperature of the heat-shrinkable polyester film and anti-breakage properties may be difficult.

Furthermore, it is because when the content of the crystalline polyester resin is excessively large, there is a possibility that the range in which predetermined factors affecting the heat shrinkage rate near the shrinkage temperature, anti-breakage properties, haze value, and the like can be controlled may be noticeably narrowed.

Therefore, regarding the configuration (n), it is more preferable to set the content of the non-crystalline polyester resin to a value within the range of 91% to 100% by weight, and even more preferably to a value within the range of 92% to 100% by weight, of the total amount.

(13) Others

It is preferable that various additives may be incorporated into the heat-shrinkable polyester film of the first embodiment or into one surface or both surfaces thereof, or various additives may be attached to one surface thereof or both surfaces.

More specifically, it is preferable to incorporate at least one of hydrolysis inhibitor, an antistatic agent, an ultraviolet absorber, an infrared absorber, a coloring agent, an organic filler, an inorganic filler, an organic fiber, an inorganic fiber, and the like, usually at a proportion in the range of 0.01% to 10% by weight, and more preferably at a proportion in the range of 0.1% to 1% by weight, with respect to the total amount of the heat-shrinkable polyester film.

Figure 1B:
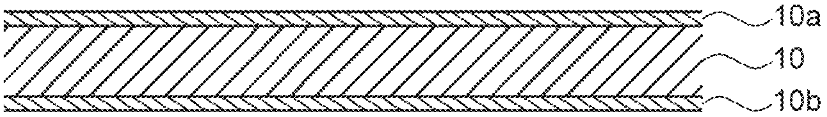

Furthermore, as shown in FIG. 1B, it is also preferable that other resin layers 10*a* and 10*b* including at least one of these various additives are laminated on one surface or both surfaces of the heat-shrinkable polyester film 10.

In that case, when the thickness of the heat-shrinkable polyester film is taken as 100%, it is preferable that the single layer thickness or the total thickness of the other resin layers to be additionally laminated is value within the range of, usually, 0.1% to 10%.

The resin as a main component constituting the other resin layers may be a polyester resin similar to the heat-shrinkable polyester film or is preferably at least one of an acrylic resin other than the polyester resin, an olefin resin, a urethane resin, a rubber material, and the like.

Figure 1C:
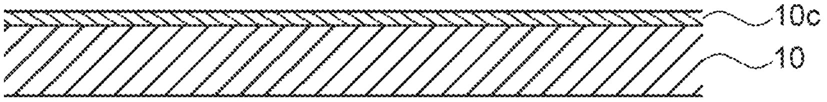

Furthermore, it is also preferable to adopt a multilayer structure for the heat-shrinkable polyester film to further promote a hydrolysis preventing effect or mechanical protection, or as shown in FIG. 1C, it is preferable to provide a shrinkage rate adjusting layer 10*c* on the surface of the heat-shrinkable polyester film 10 so that the shrinkage rate of the heat-shrinkable polyester film becomes uniform in the plane.

Such a shrinkage rate adjusting layer can be laminated by an adhesive, a coating method, a heating treatment, or the like according to the shrinkage characteristics of the heat-shrinkable polyester film.

More specifically, the thickness of the shrinkage rate adjusting layer is in the range of 0.1 to 3 μm, and when the shrinkage rate of the heat-shrinkable polyester film at a predetermined temperature is excessively large, it is preferable to laminate a shrinkage rate adjusting layer of a type suppressing the large shrinkage rate.

Furthermore, when the shrinkage rate of the heat-shrinkable polyester film at a predetermined temperature is excessively small, it is preferable to laminate a shrinkage rate adjusting layer of a type increasing the small shrinkage rate.

Therefore, it is intended to obtain a desired shrinkage rate by a shrinkage rate adjusting layer, without producing various shrink films having different shrinkage rates as the heat-shrinkable polyester film.

Second Embodiment

A second embodiment is an embodiment related to a method for producing the heat-shrinkable polyester film of the first embodiment.

1. Step of Preparing and Mixing Raw Materials

First, it is preferable to prepare main agents and additives, such as a non-crystalline polyester resin, a crystalline polyester resin, a rubber material, an antistatic agent, and a hydrolysis inhibitor, as raw materials.

Next, it is preferable that the prepared non-crystalline polyester resin, the crystalline polyester resin, and the like are introduced into an agitated vessel while being weighed, and the raw materials are mixed and stirred by using a stirring device until the mixture becomes uniform.

2. Step of Producing Raw Material Sheet

Next, it is preferable that the uniformly mixed raw materials are dried to an absolutely dry state.

Next, typically, it is preferable to perform extrusion molding and produce a raw material sheet having a predetermined thickness.

More specifically, for example, a raw material sheet having a predetermined thickness (usually, 30 to 1000 μm) can be obtained by performing extrusion molding under the conditions of an extrusion temperature of 180 °C by using an extruder (manufactured by TANABE PLASTICS MACHINERY CO., LTD.) with L/D 24 and an extrusion screw diameter of 50 mm.

3. Production of Heat-Shrinkable Polyester Film

Next, the obtained raw material sheet is heated and pressed, while being conveyed over rolls or between rolls by using a shrink film production apparatus to produce a heat-shrinkable polyester film.

That is, it is preferable to crystallize the polyester molecules constituting the heat-shrinkable polyester film into a predetermined shape, by stretching the heat-shrinkable polyester film in a predetermined direction while heating and pressing the film while basically expanding the film width, at a predetermined stretching temperature and a predetermined stretch ratio.

Then, the heat-shrinkable polyester film is solidified in that state, and thus a heat-shrinkable heat-shrinkable polyester film that is used for decoration, label, and the like can be produced.

4. Step of Inspecting Heat-Shrinkable Polyester Film

It is preferable that the following characteristics and the like are continuously or intermittently measured for the produced heat-shrinkable polyester film and provide a predetermined inspection step.

That is, a heat-shrinkable polyester film having more uniform shrinkage characteristics and the like can be obtained by measuring the following characteristics and the like by a predetermined inspection step and confirming that the values fall within predetermined ranges.

1) Visual inspection of the external appearance of the heat-shrinkable polyester film
2) Measurement of thickness variation
3) Measurement of tensile modulus
4) Measurement of tear strength
5) Measurement of viscoelasticity characteristics by using an SS curve Then, it can be said to be preferable that in the production of the heat-shrinkable polyester film of the second embodiment, when the tensile strengths in the main shrinkage direction obtained before and after immersion in water at 23 °C for 168 hours in a tensile test measured according to JIS K 7127 are designated as C1 (MPa) and C2 (MPa), the difference of these numerical values, C2–C1, is measured and calculated to be taken into consideration.

Third Embodiment

A third embodiment is an embodiment related to a method of using a heat-shrinkable polyester film.

Therefore, known methods of using shrink films can all be suitably applied.

For example, on the occasion of implementing a method of using a heat-shrinkable polyester film, first, a heat-shrinkable polyester film is cut into an appropriate length and an appropriate width, and at the same time, a long tubular object is formed.

Next, this long tubular object is supplied to an automatic label mounting apparatus (shrink labeler) and further cut into a necessary length, and this is fitted around a PET bottle or the like filled with contents.

Next, as a heating treatment of the heat-shrinkable polyester film fitted around a PET bottle or the like, the PET bottle or the like is passed through the inside of a hot air tunnel or a steam tunnel at a predetermined temperature.

Then, the heat-shrinkable polyester film is uniformly heated and caused to thermally shrink by emitting radiant heat such as infrared radiation or blowing heated vapor at about 90 °C, which are provided in these tunnels.

Accordingly, the heat-shrinkable polyester film is closely adhered to the outer surface of the PET bottle or the like, and a container with a label can be quickly obtained.

Here, the heat-shrinkable polyester film of the present invention has a feature that at least the above-described configuration (a) is satisfied.

In this manner, for a heat-shrinkable heat-shrinkable polyester film, changes in physical properties of the film in a high-humidity environment can be suppressed, and excellent storage stability and breakage resistance characteristics can be obtained.

Therefore, as shown in FIG. 5A, the film does not break even when stretched, and deterioration of the breakage resistance characteristics resulting from changes in physical properties caused by deterioration over time in a high-humidity environment can be prevented.

On the other hand, when at least the configuration (a) is not satisfied, the changes in physical properties caused by deterioration over time may not be suppressed, and the film breaks, as shown in FIG. 5B.

Incidentally, since the heat-shrinkable polyester film of the present invention substantially does not include a structural unit derived from lactic acid, there is also an advantage that strict humidity management and the like under storage conditions are not required.

EXAMPLES

Hereinafter, the present invention will be described in detail based on Examples. However, the scope of rights of the present invention shall not be narrowed by the description of the Examples without any particular reason.

Incidentally, the resins used for the Examples and the like are as follows.

(PETG1)

Non-crystalline polyester formed from dicarboxylic acid: 100 mol % of terephthalic acid, and diol: 68 mol % of ethylene glycol, 22 mol % of 1,4-cyclohexanedimethanol, and 10 mol % of diethylene glycol (PETG2)

Non-crystalline polyester formed from dicarboxylic acid: 100 mol % of terephthalic acid, and diol: 72 mol % of diethylene glycol, 25 mol % of neopentyl glycol, and 3 mol % of diethylene glycol (PETG3)

Non-crystalline polyester formed from dicarboxylic acid: 100 mol % of terephthalic acid, and diol: 63 mol % of ethylene glycol, 24 mol % of 1,4-cyclohexanedimethanol, and 13 mol % of diethylene glycol (PETG4)

Non-crystalline polyester formed from dicarboxylic acid: 100 mol % of terephthalic acid, and diol: 67 mol % of ethylene glycol, 17 mol % of 1,4-butanediol, 16 mol % of neopentyl glycol, and 2 mol % of diethylene glycol (APET)

Crystalline polyester formed from dicarboxylic acid: 100 mol % of terephthalic acid, and diol: 100 mol % of ethylene glycol Example 1

1. Production of Heat-Shrinkable Polyester Film 100 parts by weight (pbw) of a non-crystalline polyester resin (PETG1) was used in an agitated vessel.

Next, this raw material was dried to an absolutely dry state, subsequently extrusion molding was performed under the conditions of an extrusion temperature of 180 °C by using an extruder (manufactured by TANABE PLASTICS MACHINERY CO., LTD.) with L/D 24 and an extrusion screw diameter of 50 mm, and a raw material sheet having a thickness of 200 μm was obtained.

Next, a heat-shrinkable polyester film (blending ratio of APET 0%, the heat shrinkage rate in the TD direction at the time of heating at 100 °C for 10 seconds was 80%, and the heat shrinkage rate in the MD direction was 5%) having a thickness of 30 μm was produced from the raw material sheet at a stretching temperature of 76 °C and a predetermined stretch ratio (MD direction: 105%, TD direction: 460%) by using a shrink film production apparatus.

2. Evaluation of Heat-Shrinkable Polyester Film (1) Evaluation 1: Variation in Thickness The thickness (the desired value 30 μm was taken as a reference value) of the obtained heat-shrinkable polyester film was measured with a micrometer and evaluated according to the following criteria as Eva 1.

⊙ (Very good): The variation in thickness is a value within the range of (reference value ±0.1 μm).

○ (Good): The variation in thickness is a value within the range of (reference value ±0.5 μm).

Δ (Fair): The variation in thickness is a value within the range of (reference value ±1.0 μm).

X (Bad): The variation in thickness is a value within the range of (reference value ±3.0 μm).

(2) Evaluation 2: Heat Shrinkage Rate 1 (A1)

The obtained heat-shrinkable polyester film (TD direction) was immersed in hot water at 90 °C for 10 seconds (condition A1) by using a constant-temperature tank to cause the film to thermally shrink.

Next, from the dimensional change before and after the heating treatment at a predetermined temperature (hot water at 90 °C), the heat shrinkage rate (A1) was calculated by the following Formula (6) and evaluated according to the following criteria as Eva 2.

$$\text{Heat shrinkage rate} = \frac{\text{Length of film before heat shrinkage} - \text{Length of film after heat shrinkage}}{\text{Length of film before heat shrinkage}} \times 100 \quad (6)$$

⊙ (Very good): The heat shrinkage rate (A1) has a value within the range of 70% to 83%.

○ (Good): The heat shrinkage rate (A1) has a value within the range of 60% to 85% and is outside the above-described range of ⊙.

Δ (Fair): The heat shrinkage rate (A1) has a value within the range of 50% to 87% and is outside the above-described range of ○.

X (Bad): The heat shrinkage rate (A1) has a value of below 50% or above 87%.

(3) Evaluation 3: Heat Shrinkage Rate 2 (A2)

The obtained heat-shrinkable polyester film (TD direction) was immersed in hot water at 98 °C for 10 seconds (condition A2) by using a constant-temperature tank to cause the film to thermally shrink.

Next, from the dimensional change before and after the heating treatment at a predetermined temperature (hot water at 98 °C), the heat shrinkage rate (A2) was calculated by the above-described Formula (6) and evaluated according to the following criteria as Eva 3.

⊙ (Very good): The heat shrinkage rate (A2) has a value within the range of 75% to 85%.

○ (Good): The heat shrinkage rate (A2) has a value within the range of 70% to 90% and is outside the above-described range of ⊙.

Δ (Fair): The heat shrinkage rate (A2) has a value within the range of 65% to 95% and is outside the above-described range of ○.

X (Bad): The heat shrinkage rate (A2) has a value of below 65% or above 95%.

(4) Evaluation 4: Heat Shrinkage Rate 3 (B1)

The obtained heat-shrinkable polyester film (MD direction) was immersed in hot water at 90 °C for 10 seconds (condition B1) by using a constant-temperature tank to cause the film to thermally shrink.

Next, from the dimensional change before and after the heating treatment at a predetermined temperature (hot water at 90 °C), the heat shrinkage rate (B1) was calculated according to the above-described Formula (6) and evaluated according to the following criteria as Eva 4.

⊙ (Very good): The heat shrinkage rate (B1) has a value of below 5%.

○ (Good): The heat shrinkage rate (B1) has a value of below 10%.

Δ (Fair): The heat shrinkage rate (B1) has a value of below 15%.

X (Bad): The heat shrinkage rate (B1) has a value of 15% or more.

(5) Evaluation 5: Heat Shrinkage Rate 4 (B2)

The obtained heat-shrinkable polyester film (MD direction) was immersed in hot water at 98 °C for 10 seconds (condition B2) by using a constant-temperature tank to cause the film to thermally shrink.

Next, from the dimensional change before and after the heating treatment at a predetermined temperature (hot water at 98 °C), the heat shrinkage rate (B2) was calculated according to the above-described Formula (6) and evaluated according to the following criteria as Eva 5.

⊙ (Very good): The heat shrinkage rate (B2) has a value of below 5%.

○ (Good): The heat shrinkage rate (B2) has a value of below 10%.

Δ (Fair): The heat shrinkage rate (B2) has a value of below 15%.

X (Bad): The heat shrinkage rate (B2) has a value of 15% or more.

(6) Evaluation 6: Heat Shrinkage Rate 5 (A2−A1)

From the heat shrinkage rates A1 and A2 of the obtained heat-shrinkable polyester film, A2−A1 was calculated and evaluated according to the following criteria as Eva 6.

⊙ (Very good): The heat shrinkage rate (A2−A1) has a value of 4% or less.

○ (Good): The heat shrinkage rate (A2−A1) has a value of 5% or less.

Δ (Fair): The heat shrinkage rate (A2−A1) has a value of 6% or less.

X (Bad): The heat shrinkage rate (A2−A1) has a value of above 6%.

(7) Evaluation 7: Tensile Strength 1 (C1)

The obtained heat-shrinkable polyester film was cut into a short strip having a width of 15 mm in the MD direction and a length of 200 mm in the TD direction, and this was prepared as a test specimen.

Next, a tensile test was performed according to JIS K 7127 in an atmosphere at a temperature of 23 °C and a relative humidity of 50% RH at a tensile rate of 200 mm/min, and the tensile strength C1 in the TD direction of the prepared test specimen was measured and evaluated according to the following criteria as Eva 7.

⊙ (Very good): Tensile strength 1 (C1) has a value within the range of 55 to 70 MPa.

○ (Good): Tensile strength 1 (C1) has a value within the range of 50 to 75 MPa and is outside the above-described range of ⊙.

Δ (Fair): Tensile strength 1 (C1) has a value within the range of 45 to 80 MPa and is outside the above-described range of ○.

X (Bad): Tensile strength 1 (C1) has a value of below 45 MPa or above 80 MPa.

(8) Evaluation 8: Tensile Strength 2 (C2)

The obtained heat-shrinkable polyester film was immersed in water at 23 °C for 168 hours as an aging treatment.

Next, a test specimen similar to that of Evaluation 7 was prepared from the film after the aging treatment.

Next, a tensile test was performed according to JIS K 7127 in an atmosphere at a temperature of 23 °C and a relative humidity of 50% RH at a tensile rate of 200 mm/min, and the tensile strength C1 in the TD direction of the prepared test specimen was measured and evaluated according to the following criteria as Eva 8.

⊙ (Very good): Tensile strength 2 (C2) has a value within the range of 55 to 70 MPa.

○ (Good): Tensile strength 2 (C2) has a value within the range of 50 to 75 MPa and is outside the above-described range of ⊙.

Δ (Fair): Tensile strength 2 (C2) has a value within the range of 45 to 80 MPa and is outside the above-described range of ○.

X (Bad): Tensile strength 2 (C2) has a value of below 45 MPa or above 80 MPa.

(9) Evaluation 9: Tensile Strength 3 (C2− C1)

From the tensile strengths C1 (MPa) and C2 (MPa) of the obtained heat-shrinkable polyester film, C2−C1 (MPa) was calculated and evaluated according to the following criteria as Eva 9.

⊙ (Very good): Tensile strength 3 (C2−C1) has a value of above −4.6 MPa, which is also a value of below 3.4 MPa.

○ (Good): Tensile strength 3 (C2−C1) has a value of above −5.3 MPa, which is also a value of below 4.2 MPa, and is outside the above-described range of ⊙.

Δ (Fair): Tensile strength 3 (C2−C1) has a value of above −6 MPa, which is also a value of below 5 MPa, and is outside the above-described range of ○.

X (Bad): Tensile strength 3 (C2−C1) has a value of −6 MPa or less or 5 MPa or more.

(10) Evaluation 10: Tensile Strength 4 ((C2−C1)/{(1−A1/100)×(1−B1/100)})

From the heat shrinkage rates A1(%) and B1(%), and the tensile strengths C1 (MPa) and C2 (MPa) of the obtained heat-shrinkable polyester film, (C2−C1)/{(1−A1/100)×(1−B1/100)} (MPa) (hereinafter, referred to as variable D) was calculated and evaluated according to the following criteria as Eva 10.

⊙ (Very good): Tensile strength 4 (variable D) has a value within the range of −8 to 6.5 MPa.

○ (Good): Tensile strength 4 (variable D) has a value within the range of −13 to 9.5 MPa and is outside the above-described range of ⊙.

Δ (Fair): Tensile strength 4 (variable D) has a value within the range of −18 to 12.5 MPa and is outside the above-described range of ○.

X (Bad): Tensile strength 4 (variable D) has a value of below −18 MPa or above 12.5 MPa.

(11) Evaluation 11: Tensile Strength 5 (C1/C2)

From the tensile strengths C1 (MPa) and C2 (MPa) of the obtained heat-shrinkable polyester film, C1/C2 was calculated and evaluated according to the following criteria as Eva 11.

⊙ (Very good): Tensile strength 4 (C1/C2) has a value within the range of 0.96 to 1.06.

○ (Good): Tensile strength 4 (C1/C2) has a value within the range of 0.95 to 1.07 and is outside the above-described range of ⊙.

Δ (Fair): Tensile strength 4 (C1/C2) has a value within the range of 0.94 to 1.08 and is outside the above-described range of ○.

X (Bad): Tensile strength 4 (C1/C2) has a value of below 0.94 or above 1.08.

(12) Evaluation 12: Breakage Resistance Characteristics

The obtained heat-shrinkable polyester film was immersed in water at 23 °C for 168 hours as an aging treatment.

Next, test specimens (five pieces) similar to that of Evaluation 7 were prepared from the film after the aging treatment.

Next, a tensile test was performed by using the test specimens (five pieces) after the aging treatment as samples, according to JIS K 7127 in an atmosphere at a temperature of 23 °C and a relative humidity of 50% RH at a tensile rate of 200 mm/min, and the number of samples that broke in an elastic region in a stress-strain curve was evaluated as the breakage resistance characteristic according to the following criteria as Eva 12.

Incidentally, tensile strength (E) as the maximum stress in the stress-strain curve after immersion for 168 hours in water at 23 °C was measured, which was 66.1 MPa, and the number of test specimens in which a breakage phenomenon occurred was zero out of five pieces. In addition, a heat-shrinkable polyester film was produced, and tensile strength (G) as the maximum stress in the stress-strain curve was measured before a period of one month passed under room temperature conditions. The tensile strength (G) was 66.1 MPa, and the number of test specimens in which a breakage phenomenon occurred was zero out of five pieces. Therefore, the numerical value represented by E/G×100 in Example 1 was calculated to be 100%.

⊙ (Very good): In all of the five pieces of test specimens, a breakage phenomenon was not observed.

○ (Good): A breakage phenomenon was observed in one or fewer pieces among the five pieces of test specimens.

Δ (Fair): The occurrence of a breakage phenomenon was observed in two or more pieces among the five pieces of test specimens.

X (Bad): The occurrence of a breakage phenomenon was observed in three or more pieces among the five pieces of test specimens.

(13) Evaluation 13: Haze Value

The haze value of the obtained heat-shrinkable polyester film was measured according to JIS K 7105 and evaluated according to the following criteria as Eva 13.

⊙ (Very good): Has a value of 1% or less.

○ (Good): Has a value of 3% or less.

Δ (Fair): Has a value of 5% or less.

X (Bad): Has a value of above 5%.

Examples 2 and 3

In Examples 2 and 3, the heat shrinkage rate 1 (A1), heat shrinkage rate 3 (B1), tensile strength 3 (C2–C1), and the like were evaluated in the same manner as in Example 1, except that various heat-shrinkable polyester films were produced in the same manner as in Example 1 by changing each value of the configuration (a) and the like as shown in Table 1.

That is, in Example 2, evaluation was performed in the same manner as in Example 1, except that a heat-shrinkable polyester film (APET blending ratio 0%) having a thickness of 51 μm was produced by using a non-crystalline polyester resin (PETG3) as a raw material and changing the extrusion conditions. The results are shown in Table 2.

Incidentally, in Example 2, tensile strength (E) was measured in the same manner as in Evaluation 12 of Example 1, which was 56.8 MPa, and the number of test specimens in which a breakage phenomenon occurred was 0 among five pieces. Furthermore, a heat-shrinkable polyester film was produced, and tensile strength (G) in the stress-strain curve was measured in the same manner before a period of month passed under room temperature conditions. The tensile strength (G) was 56.5 MPa, and the number of test specimens in which a breakage phenomenon occurred was zero out of five pieces. Therefore, the numerical value represented by E/G×100 of Example 2 was calculated to be 101%.

Furthermore, in Example 3, evaluation was performed in the same manner as in Example 1, except that a heat-shrinkable polyester film (APET blending ratio 0%) having a thickness of 29 μm was produced by using a non-crystalline polyester resin (PETG2) as a raw material and changing the extrusion conditions. The results are presented in Table 2.

Incidentally, in Example 3, tensile strength (E) was measured in the same manner as in Evaluation 12 of Example 1, which was 67.8 MPa, and the number of test specimens in which a breakage phenomenon occurred was zero out of five pieces. In addition, a heat-shrinkable polyester film was produced, and tensile strength (G) in the stress-strain curve was measured in the same manner before a period of one month passed under room temperature conditions. The tensile strength (G) was 67.8 MPa, and the number of test specimens in which a breakage phenomenon occurred was 0 among five pieces. Therefore, the numerical value represented by E/G×100 of Example 3 was calculated to be 100%.

Comparative Examples 1 to 4

In Comparative Examples 1 to 4, heat-shrinkable polyester films that each did not satisfy the configuration requirement (a) and the like were produced as shown in Table 1, and the heat shrinkage rate 1 (A1), heat shrinkage rate 3 (B1), tensile strength 3 (C2–C1), and the like were evaluated in the same manner as in Example 1.

That is, in Comparative Example 1, a heat-shrinkable polyester film (APET blending ratio 0%, the shrinkage rate in the TD direction at the time of heating at 100 °C for 10 seconds was 71%, and the shrinkage rate in the MD direction was 3%) having a thickness of 30 μm was produced by using a non-crystalline polyester resin (PETG1) as a raw material and changing the extrusion conditions, and the results obtained by evaluating the heat-shrinkable polyester film in the same manner as in Example 1 are shown in Table 2.

Incidentally, in Comparative Example 1, tensile strength (E) as the maximum stress in the stress-strain curve after immersing the heat-shrinkable polyester film for 168 hours in water at 23 °C was measured in the same manner as in Evaluation 12 of Example 1, the tensile strength (E) was 55.9 MPa, and the number of test specimens in which a breakage phenomenon occurred was two out of five pieces. In addition, a heat-shrinkable polyester film was produced, and tensile strength (G) as the maximum stress in the stress-strain curve was measured in the same manner before a period of one month passed under room temperature conditions. The tensile strength (G) was 61.2 MPa, and the number of test specimens in which a breakage phenomenon occurred was zero out of five pieces. Therefore, the numerical value represented by E/G×100 of Comparative Example 1 was calculated to be 91%.

Furthermore, in Comparative Example 2, a heat-shrinkable polyester film (APET blending ratio 0%, the shrinkage rate in the TD direction at the time of heating at 100 °C for 10 seconds was 65%, and the shrinkage rate in the MD direction was 11%) having a thickness of 25 μm was produced by using a non-crystalline polyester resin (PETG1) as a raw material and changing the extrusion conditions, and the results obtained by evaluating the heat-shrinkable polyester film in the same manner as in Example 1 are shown in Table 2.

Incidentally, in Comparative Example 2, the tensile strength (E) was measured in the same manner as in Evaluation 12 of Example 1, which was 59.1 MPa, and the number of test specimens in which a breakage phenomenon occurred was three out of five pieces. In addition, the tensile strength (G) was measured before a period of one month passed under room temperature conditions, which was 67.1 MPa, and the number of test specimens in which a breakage phenomenon occurred was zero out of five pieces. Therefore, the numerical value represented by E/G×100 of Comparative Example 2 was calculated to be 88%.

Furthermore, in Comparative Example 3, 90 parts by weight of a non-crystalline polyester resin (PETG1) and 10 parts by weight of a crystalline polyester resin (APET) were mixed at these proportions, and a heat-shrinkable polyester film (APET blending ratio 10%, the shrinkage rate in the TD direction at the time of heating at 100 °C for 10 seconds was 62%, and the shrinkage rate in the MD direction was 4%) having a thickness of 30 μm was produced by using the mixture as a raw material and changing the extrusion conditions.

Incidentally, in Comparative Example 3, the tensile strength (E) was measured in the same manner as in Evaluation 12 of Example 1, which was 62.0 MPa, and the number of test specimens in which a breakage phenomenon occurred was three out of five pieces. Furthermore, the tensile strength (G) was measured before a period of one month passed under room temperature conditions, which was 57.8 MPa, and the number of test specimens in which a breakage phenomenon occurred was two out of five pieces. Therefore, the numerical value represented by E/G×100 of Comparative Example 3 was calculated to be 107%.

Furthermore, in Comparative Example 4, a heat-shrinkable polyester film was produced and evaluated in the same manner as in Example 1, and the results are shown in Table 2.

That is, a heat-shrinkable polyester film (APET blending ratio 0%) having a thickness of 40 μm was produced by using a non-crystalline polyester resin (PETG4) as a raw material and changing the extrusion conditions.

Incidentally, in Comparative Example 4, the tensile strength (E) was measured in the same manner as in Evaluation 12 of Example 1, which was 65.1 MPa, and the number of test specimens in which a breakage phenomenon occurred was two out of five pieces. In addition, the tensile strength (G) was measured before a period of one month passed under room temperature, which was 71.5 MPa, and the number of test specimens in which a breakage phenomenon occurred was zero out of five pieces. Therefore, the numerical value represented by E/G×100 of Comparative Example 4 was calculated to be 91%.

TABLE 1

| | PETG1 (pbw) | PETG2 (pbw) | PETG3 (pbw) | PETG4 (pbw) | APET (pbw) | Stretching temperature (°C) | Thermal fixation temperature (°C) | MD stretch ratio (%) | TD stretch ratio (%) | Thickness t (μm) |
|---|---|---|---|---|---|---|---|---|---|---|
| Example 1 | 100 | | | | | 76 | 73 | 105 | 460 | 30 |
| Example 2 | | | 100 | | | 75 | 83 | 100 | 530 | 51 |
| Example 3 | | 100 | | | | 75 | 73 | 105 | 480 | 29 |
| Comparative Example 1 | 100 | | | | | 83 | 81 | 105 | 480 | 30 |
| Comparative Example 2 | 100 | | | | | 86 | 85 | 111 | 500 | 25 |
| Comparative Example 3 | 90 | | | | 10 | 83 | 82 | 100 | 500 | 30 |
| Comparative Example 4 | | | | 100 | | 80 | 75 | 105 | 480 | 40 |

TABLE 2

| | Configuration | | | | | | | | | |
|---|---|---|---|---|---|---|---|---|---|---|
| | (a) C2-C1 (MPa) | (b) A1 (%) | (c) B1 (%) | (e)* (MPa) | (f) C1 (MPa) | (f) C2 (MPa) | (g) C1/C2 (−) | (h) A2 (%) | (h) B2 (%) | (i) A2-B2 (%) |
| Example 1 | 0.00 | 77.7 | 3.8 | 0.00 | 66.10 | 66.10 | 1.00 | 80.0 | 5.0 | 2.3 |
| Example 2 | 0.35 | 76.0 | −2.0 | 1.43 | 56.46 | 56.81 | 0.99 | 78.0 | 0.0 | 2.0 |
| Example 3 | 0.00 | 79.5 | 1.5 | 0.00 | 67.80 | 67.80 | 1.00 | 80.0 | 3.0 | 0.5 |
| Comparative Example 1 | −5.30 | 59.8 | 1.7 | −13.41 | 61.20 | 55.90 | 1.09 | 71.0 | 3.0 | 11.2 |
| Comparative Example 2 | −8.00 | 54.5 | 7.5 | −19.01 | 67.10 | 59.10 | 1.14 | 65.0 | 11.0 | 10.5 |
| Comparative Example 3 | 4.20 | 55.5 | 4.1 | 9.84 | 57.80 | 62.00 | 0.93 | 64.5 | 5.5 | 9.0 |
| Comparative Example 4 | −6.41 | 70.0 | 5.0 | −22.49 | 71.47 | 65.06 | 1.10 | 73.0 | 4.5 | 3.0 |

| | Eva 1 | Eva 2 | Eva 3 | Eva 4 | Eva 5 | Eva 6 | Eva 7 | Eva 8 | Eva 9 | Eva 10 | Eva 11 | Eva 12 | Eva 13 |
|---|---|---|---|---|---|---|---|---|---|---|---|---|---|
| Example 1 | ◎ | ◎ | ◎ | ◎ | ○ | ◎ | ◎ | ◎ | ◎ | ◎ | ◎ | ◎ | ◎ |
| Example 2 | ◎ | ◎ | ◎ | ◎ | ◎ | ◎ | ◎ | ◎ | ◎ | ◎ | ◎ | ◎ | ◎ |
| Example 3 | ◎ | ◎ | ◎ | ◎ | ◎ | ◎ | ◎ | ◎ | ◎ | ◎ | ◎ | ◎ | ◎ |
| Comparative Example 1 | ◎ | Δ | Δ | ◎ | ◎ | X | ◎ | ◎ | Δ | Δ | X | Δ | ◎ |
| Comparative Example 2 | ◎ | Δ | Δ | ○ | Δ | X | ◎ | ◎ | X | X | X | X | ◎ |
| Comparative Example 3 | ◎ | Δ | X | ◎ | X | X | ◎ | ◎ | Δ | Δ | X | X | ◎ |
| Comparative Example 4 | ◎ | ◎ | ○ | ○ | ◎ | ◎ | ○ | ◎ | X | X | X | Δ | ◎ |

*(e) = (C2 − C1) / {(1 − A1/100) × (1 − B1/100)} (MPa)

*Eva 1: Variation in thickness

*Eva 2 to 6: Heat shrinkage rates 1 to 5

*Eva 7 to 11: Tensile strengths 1 to 5

*Eva 12: Breakage resistance characteristics

*Eva 13: Haze value

INDUSTRIAL APPLICABILITY

According to the present invention, there can be provided a heat-shrinkable polyester film or the like, which solves the defects of conventional heat-shrinkable polyester-based films, has storage stability with less change in the physical properties even in a high-humidity environment by limiting at least the difference (C2–C1) between tensile strengths C1 and C2 to a value within a predetermined range, and has breakage resistance characteristics when the heat-shrinkable polyester film is caused to thermally shrink under predetermined conditions.

Therefore, according to the heat-shrinkable polyester film of the present invention, since the heat-shrinkable polyester film can be applied to various PET bottles and the like, and the environmental conditions during storage are eased, the general-purpose usability can be remarkably improved, and it can be said that the industrial applicability of the heat-shrinkable polyester film is very high.

The invention claimed is:

1. A heat-shrinkable polyester film derived from a polyester resin,

Wherein, when in a tensile test measured according to JIS K 7127, tensile strengths in a main shrinkage direction obtained before and after immersion in water at 23 °C for 168 hours are designated as C1 (MPa) and C2 (MPa), the heat-shrinkable polyester film satisfies the following Relational Expression (1)

$$-5.3<(C2-C1)<4.2 \quad (1).$$

2. The heat-shrinkable polyester film according to claim 1, wherein when satisfying the Relational Expression (1) is designated as configuration (a), the heat-shrinkable polyester film not only has the configuration (a) but also has the following configurations (b) and (c):

(b) when the main shrinkage direction is designated as TD direction, and a heat shrinkage rate in the TD direction in a case where the heat-shrinkable polyester film is caused to shrink under the conditions of 10 seconds in hot water at 90 °C is designated as A1, this A1 is set to a value of 60% or more; and (c) when a direction orthogonally intersecting the TD direction is designated as MD direction, and a heat shrinkage rate in the MD direction in a case where the heat-shrinkable polyester film is caused to shrink under the conditions of 10 seconds in hot water at 90 °C is designated as B1, this B1 is set to a value of below 10%.

3. The heat-shrinkable polyester film according to claim 2, wherein the heat shrinkage rate A1, the heat shrinkage rate B1, the tensile strength C1, and the tensile strength C2 satisfy the following Relational Expression (2).

$$-13 \leqq \frac{C2-C1}{\left(1-\frac{A1}{100}\right)\times\left(1-\frac{B1}{100}\right)} \leqq 9.5. \quad (2)$$

4. The heat-shrinkable polyester film according to claim 1, wherein a value of the tensile strength C1 is set to a value within the range of 50 to 75 MPa, and the tensile strength C2 is set to a value within the range of 50 to 75 MPa.

5. The heat-shrinkable polyester film according to claim 1, wherein the tensile strength C1 and the tensile strength C2 satisfy the following Relational Expression (3).

$$0.95 \leqq \frac{C1}{C2} \leqq 1.07. \quad (3)$$

6. The heat-shrinkable polyester film according to claim 2, wherein when a heat shrinkage rate in the TD direction obtained in a case where the heat-shrinkable polyester film is caused to shrink under the conditions of 10 seconds in hot water at 98 °C is designated as A2, this A2 is set to a value of 70% or more, and when a heat shrinkage rate in the MD direction obtained in a case where the heat-shrinkable polyester film is caused to shrink under the conditions of 10 seconds in hot water at 98 °C is designated as B2, this B2 is set to a value of below 10%.

7. The heat-shrinkable polyester film according to claim 6, wherein the heat shrinkage rate A1 and the heat shrinkage rate A2 satisfy the following Relational Expression (4)

$$(A2-A1)\leq 5 \quad (4).$$

8. The heat-shrinkable polyester film according to claim 1, wherein a haze value of the film before shrinkage as measured according to JIS K 7105 is set to a value of 5% or less.

9. The heat-shrinkable polyester film according to claim 1, wherein the heat-shrinkable polyester film includes a non-crystalline polyester at a proportion in the range of 90% to 100% by weight of a total amount of resins.

10. The heat-shrinkable polyester film according to claim 9, wherein the heat-shrinkable polyester film includes a non-crystalline polyester at a proportion in the range of 91% to 100% by weight of a total amount of resins.

11. The heat-shrinkable polyester film according to claim 9, wherein the non-crystalline polyester resin is formed from a dicarboxylic acid comprising at least 80 mol % of terephthalic acid; and diols comprising 50 mol % to 80 mol % of ethylene glycol and 20 mol % to 50 mol % of one or more diols selected from 1,4-cyclohexanedimethanol, neopentyl glycol, and diethylene glycol.

12. The heat-shrinkable polyester film according to claim 11, wherein the diols comprise 50 mol % to 80 mol % of ethylene glycol and 20 mol % to 50 mol % of one or more diols selected from 1,4-cyclohexanedimethanol, and diethylene glycol.

13. The heat-shrinkable polyester film according to claim 11, wherein the diols comprise 50 mol % to 80 mol % of ethylene glycol and 20 mol % to 50 mol % of one or more diols selected from neopentyl glycol, and diethylene glycol.

* * * * *